US012743604B2

(12) United States Patent
Buechel et al.

(10) Patent No.: US 12,743,604 B2
(45) Date of Patent: Sep. 22, 2026

(54) FUNCTION-BASED ACTIVATION OF MEMORY TIERS

(71) Applicant: International Business Machines Corporation, Armonk, NY (US)

(72) Inventors: Julian Roettger Buechel, Zurich (CH); Manuel Le Gallo-Bourdeau, Horgen (CH); Irem Boybat Kara, Adliswil (CH); Abbas Rahimi, Rueschlikon (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 17/943,256

(22) Filed: Sep. 13, 2022

(65) Prior Publication Data

US 2024/0086682 A1 Mar. 14, 2024

(51) Int. Cl.
*G06N 3/042* (2023.01)
*G06N 3/082* (2023.01)

(52) U.S. Cl.
CPC ............. *G06N 3/042* (2023.01); *G06N 3/082* (2013.01)

(58) Field of Classification Search
None
See application file for complete search history.

(56) References Cited

U.S. PATENT DOCUMENTS 10,719,761 B2 7/2020 Shazeer et al.
2019/0102359 A1* 4/2019 Knag .................... G11C 11/418

(Continued)

FOREIGN PATENT DOCUMENTS

CN 119866498 A 4/2025
EP 4587960 A1 7/2025
WO 2024/057114 A1 3/2024

OTHER PUBLICATIONS

Shim, Wonbo, and Shimeng Yu. "Technological design of 3D NAND-based compute-in-memory architecture for GB-scale deep neural network." IEEE Electron Device Letters 42.2 (2020): 160-163. (Year: 2020).*

(Continued)

*Primary Examiner* — Eric Nilsson
(74) *Attorney, Agent, or Firm* — Scully, Scott, Murphy & Presser, P.C.; Kimberly S. Zillig

(57) ABSTRACT

A 3D compute-in-memory accelerator system and method for efficient inference of Mixture of Expert (MoE) neural network models. The system includes a plurality of compute-in-memory cores, each in-memory core including multiple tiers of in-memory compute cells. One or more tiers of in-memory compute cells correspond to an expert sub-model of the MoE model. One or more expert sub-models are selected for activation propagation based on a function-based routing, the tiers of the corresponding experts being activated based on this function. In one embodiment, this function is a hash-based tier selection function used for dynamic routing of inputs and output activations. In embodiments, the function is applied to select a single expert or multiple experts with input data-based or with layer-activation-based MoEs for single tier activation. Further, the system is configured as a multi-model system with single expert model selection or with a multi-model system with multi-expert selection.

17 Claims, 14 Drawing Sheets

(56) References Cited

U.S. PATENT DOCUMENTS

2019/0251423 A1 8/2019 Shazeer et al.
2022/0012564 A1 1/2022 Zjajo et al.

OTHER PUBLICATIONS

Ma, X., et al., "BaGuaLu: Targeting Brain Scale Pretrained Models with over 37 Million Cores", PPoPP '22, Apr. 2-6, 2022, 13 pages.
Wang, P., et al., "Three-Dimensional NAND Flash for Vector-Matrix Multiplication", IIEEE Transactions on Very Large Scale Integration (VLSI) Systems, Apr. 2019, pp. 988-991, vol. 27, No. 4.
International Search Report and Written Opinion dated Nov. 29, 2023 issued in PCT/IB2023/057991, 15 pages.
Zoph, Barret et al., "ST-MoE: Designing Stable and Transferable Sparse Expert Models," arXiv preprint arXiv:2202.08906, Apr. 29, 2022, pp. 1-38.
Rosenfeld, Jonathan S., "Scaling laws for deep learning," Thesis, Massachusetts Institute of Technology, Aug. 17, 2021, pp. 1-140.
Roller, Stephen, Sainbayar Sukhbaatar, and Jason Weston, "Hash layers for large sparse models," Advances in Neural Information Processing Systems 34, 35th Conference on Neural Information Processing Systems (2021), pp. 1-12.
Fedus, William, Barret Zoph, and Noam Shazeer, "Switch transformers: Scaling to trillion parameter models with simple and efficient sparsity," Journal of Learning Research 23, Apr. 2022, pp. 1-40.
Wonbo et al., "Technological Design of 3D NAND-Based Compute-in-Memory Architecture for GB-Scale Deep Neural Network", IEEE Electron Device Letters, Feb. 2021, pp. 1-4, vol. 42, No. 2.
Shazeer, Noam, et al., "Outrageously large neural networks: The sparsely-gated mixture-of-experts layer," Conference Paper at ICLR 2017, Jan. 23, 2017, pp. 1-19.
Bavandpour et al, "3D-aCortex: An Ultra-Compact Energy-Efficient Neurocomputing Platform Based on Commercial 3D-NAND Flash Memories", Aug. 2019, 2nd revision, pp. 1-14.
Bavandpour et al, "3D-aCortex: An Ultra-Compact Energy-Efficient Neurocomputing Platform Based on Commercial 3D-NAND Flash Memories", Neromorh. Comp. Eng. 1, Jun. 2, 2021, pp. 1-16.
Lue et al., "Optimal Design Methods to Transform 3D NAND Flash into a High-Density, High-Bandwidth and Low-Power Nonvolatile Computing in Memory (nvCIM) Accelerator for Deep-Learning Neural Networks (DNN)", 2019 IEEE International Electron Devices Meeting (IEDM), Dec. 2019, pp. 1-4.
Kim et al., "An Embedded NAND Flash-Based Compute-in-Memory Array Demonstrated in a Standard Logic Process", IEEE Journal of Solid-State Circuits, Jul. 2021, pp. 1-14.

* cited by examiner

FUNCTION-BASED ACTIVATION OF MEMORY TIERS

FIELD

The present disclosure relates to deep learning machine learning models and more particularly, to a neural network model system that includes tiers of compute-in-memory structures configured to implement plural expert sub-models denoted as a Mixture of Experts (MoE) to perform fast and energy efficient inference on models with billions of parameters.

BACKGROUND

Deep learning refers to use of multi-layered machine learning model architectures that use multiple layers to progressively extract higher-level features from the raw input. These machine learning models are typically artificial neural networks, e.g., convolutional neural networks (CNN)s, recurrent neural networks (RNN)s etc. trained with representation learning for use in artificial intelligence applications. Learning can be supervised, semi-supervised or unsupervised.

It has been shown that the performance of modern Deep Learning architectures increases by simply scaling up the model size (i.e., the number of parameters) and the dataset size. This paradigm creates two main challenges: Training and inference on models of this size are extremely expensive (in the order of millions for training a single model); and when the model has a large number of parameters, fast and energy-efficient inference is not possible, as it requires large amounts of DRAM.

The first challenge is commonly addressed via Mixture of Experts (MoE) systems. Mixture of experts is an ensemble learning technique in the field of neural networks and is known for its ability to scaling models to billions of parameters without inducing additional computational cost. In MoE models, predictive modeling tasks are decomposed into sub-tasks, and an expert model is trained on each sub-task. The main idea of an MoE system is that the data that is fed into the neural network is routed to a subject of experts. That is, the Mixture-of-Experts system implements a routing algorithm that routes hidden layer activations to specified experts for forward computation. By doing so, one can scale the number of experts arbitrarily by simply increasing the number of experts, while keeping the computational complexity low. The computational complexity stays low, because not all experts are chosen, but only for example, one.

Despite the advantages the MoE system brings with it, modern architectures still require a tremendous amount of parameters that make fast and energy-efficient inference impossible.

The main reason why inference of large models is slow is that one has to either: constantly shuttle the weights back and forth between the memory and GPU/CPU, or one needs very large amounts of dynamic random access memory (DRAM) to store all the needed weights. MoE systems alleviate this problem to some degree since at each time only a subset of experts is active, and therefore not all weights have to be used. However, most systems are so large that even the use of MoEs does not eliminate the problem.

SUMMARY

A system, method and computer program product for performing fast and energy-efficient inference of MoE systems, by doing computations in-memory with a 3D memory architecture.

The present disclosure relates to deep learning machine learning models and more particularly, to a neural network model system that includes tiers of compute-in-memory structures configured to implement plural expert sub-models denoted as a Mixture of Experts (MoE) with circuitry providing dynamic routing using function-based tier selection.

In an embodiment, fast inference in MoE systems using compute-in-memory structures implements a hash function.

In one aspect, there is provided a 3-dimensional compute-in-memory (CiM) system for efficient inference of Mixture of Expert (MoE) models. The system includes: a 3D memory system including multiple tiers of compute-in-memory devices, each tier comprising a memory system associated with an expert of a mixture of experts (MoE) neural network model; a control processor for selecting, responsive to received inputs, one or more tiers of the compute-in-memory devices associated with an expert at the network model layer; the control processor configuring a computing path at the selected one or more of the multiple tiers associated with the expert, the computing path for processing the inputs at the network model layer and generating one or more output activations for use at a further neural network model layer.

In an embodiment, the 3D memory system is a non-volatile memory system, e.g., a resistive memory (memristive) system or a 3D NAND Flash memory. It is understood that other types of non-volatile memory systems can be employed.

In an embodiment, an input-based or layer-activation-based function is used for selecting an MoE expert(s) for neural network processing when running deep neural network models MoEs enable selection of a compute path via the function and therefore the tile/tiers to be activated can be selected a priori if the input is used for determining the experts to be used. Further, different tiers hold the weights of different experts and tiers are switched on dynamically depending on the input/intermediate activations. If the layer activations are to be used, the expert that is selected for processing these activations can only be determined once these activations arrive.

The use of an input-based or layer-activation-based function enables selection of a single or multiple experts with input-based MoEs or a single or multiple experts with layer-activation-based MoEs for single/multiple tier activation.

The provided 3D CiM system can include a cross-bar memory and functions as an accelerator for increasing performance of matrix-vector operations during deep neural network model processing.

In a further aspect, there is provided a 3D compute-in-memory (CiM) system. The 3D CiM system includes multiple processing tiles, each one or more processing tiles corresponding to a layer of a deep neural network model, the layer receiving an input data set for inference processing using the deep neural network model, a processing tile comprises: a three-dimensional (3D) multi-tier configuration of compute-in-memory devices, each tier comprising a cross-bar array of memory cells comprising of a memory system associated with neural network model processing operations; a control processor circuit for selecting, responsive to the received input data set, one or more tiers of compute-in-memory devices associated with the neural network model; and the control processor circuit configuring a computing path at one or more of the multiple tiers associated with a selected expert, the computing path for processing the received inputs at the network model and generating one or more outputs for use at a CiM processing unit associated with a further layer of the neural network model.

Further the compute-in-memory (CiM) system is configurable as a multi-model system with single expert selection or multi-expert selection.

In yet another aspect, there is provided a method for operating a compute-in-memory system. The method comprises: configuring one or more processing tiles based on received input data, each processing tile associated with a layer of a neural network model, each processing tile comprising: a three-dimensional (3D) multi-tier configuration of compute-in-memory devices configured for processing data associated with an expert of a mixture of experts neural network model; and a control processor circuit for iteratively selecting, responsive to a received input data set, one or more tiers of compute-in-memory devices associated with the expert; selecting, responsive to received inputs, one or more tiers of compute-in-memory devices associated with the expert at the network model layer; configuring, using the control processor, a computing path at one or more selected tiers of the multiple tiers associated with the expert, the computing path for processing the inputs at the MoE network model layer and generating one or more output activations for use at a further neural network model layer.

Further features as well as the structure and operation of various embodiments are described in detail below with reference to the accompanying drawings. In the drawings, like reference numbers indicate identical or functionally similar elements.

DETAILED DESCRIPTION

Research has shown that current AI models perform better by scaling the model and dataset size. However, this presents a problem on conventional hardware (e.g., CPU, GPU) because training large models becomes impossible without sparsification.

A main reason why inference of large models is slow is that one has to either: constantly shuttle the weights back and forth between the memory and GPU/CPU, or one needs very large amounts of dynamic random access memory (DRAM) to store all the needed weights. MoE systems alleviate this problem to some degree since at each time only a subset of experts is active, and therefore not all weights have to be used. However, most systems are so large that even the use of MoEs does not eliminate the problem.

Especially, in the case of convolution operation based AI systems, the computation speed and throughput needs to be increased significantly. In-memory computing is one way that can be used for accelerating deep learning inference and training.

Figure 1:
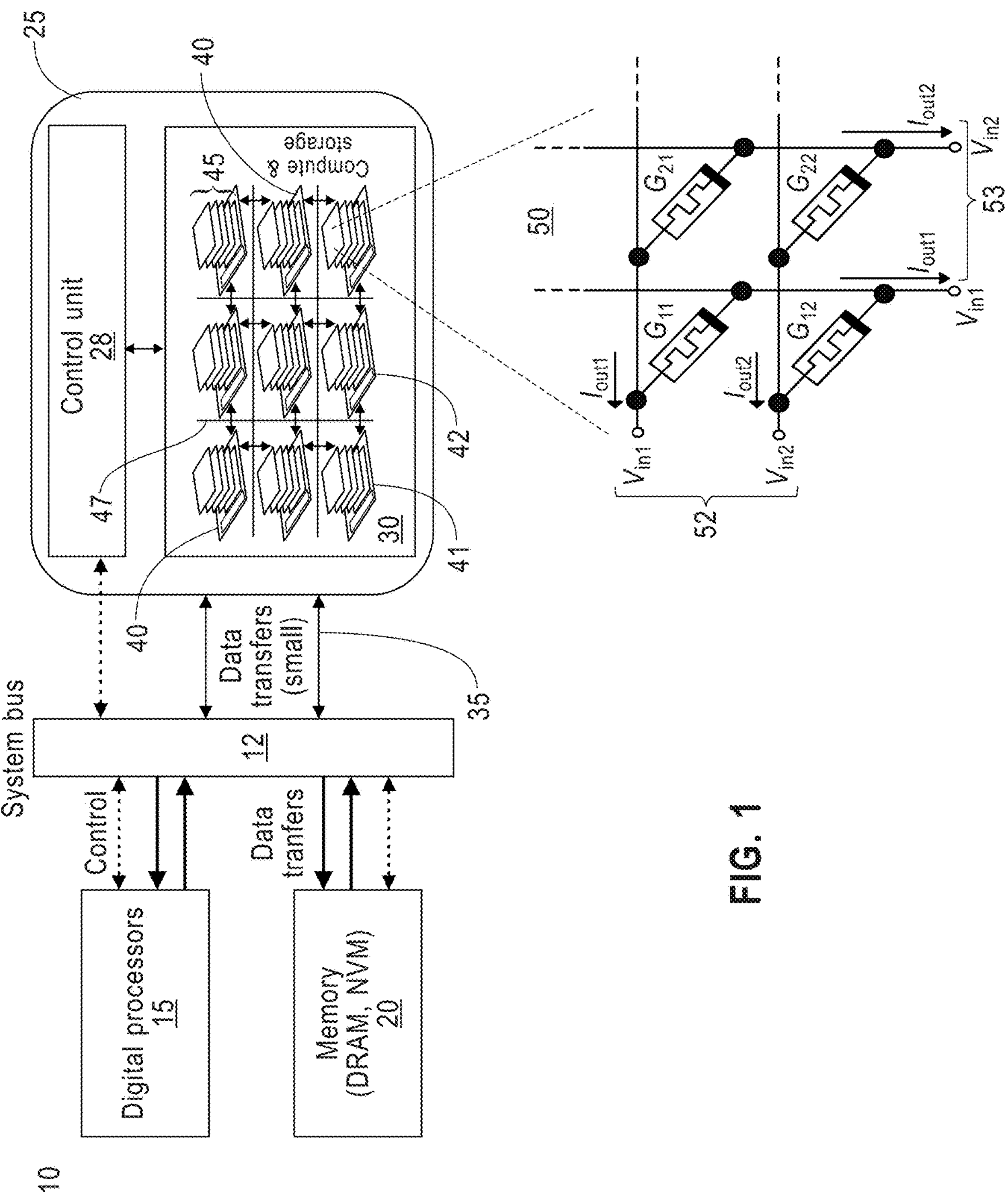
FIG. 1 is a block diagram of an example Compute-in-Memory (CiM) hardware and memory system accelerator implementing a MoE neural network models architecture in accordance with an embodiment of the invention.

FIG. 1 illustrates a compute-in-memory accelerator system 10 that enables fast and energy-efficient inference of MoE systems, by doing deep learning neural network computations in-memory with a three-dimensional (3D) non-volatile memory architecture.

As shown in FIG. 1, a CiM accelerator system 10 includes one or more digital processors 15 that issue control signals for controlling operations for many applications involving data stored at a non-volatile memory (NVM) subsystem 20 including memory devices, e.g., DRAM. A system communications bus 12 is provided for shuttling data back and forth between the memory 20 and the computational unit 15 when performing operations, e.g., Kalman filtering, Fast Fourier Transforms, linear equation solver. In accordance with an aspect of the present disclosure, further connected to system communications bus 12 is a CiM device system 25 having a control unit such as a microprocessor 28 and multiple CiM tiles 40, with each tile 40 comprising a 3D compute in memory block comprising multiple tiers 45 of 3D CiM memory devices and also including associated computing circuitry used for controlling neural network operations, e.g., an in-place matrix-vector multiply (MVM) operation, at a tier. The microprocessor 28 can be configured to govern a computation path for performing CiM MoE neural network operations, e.g., input/output and/or computations, involving a tier(s) at a tile(s). In an embodiment, depending upon a configuration of MoE models, output data such as intermediate activations generated as a result of MVM operations performed at a tier of a tile, e.g., a tile 41, can be controlled for input/transfer to another CiM device corresponding to a same or different expert, e.g., a tier at a same tile or at a different tile, e.g., tile 42, via a data transfer using a local data bus 47. In an embodiment, layer activations are inputs for different layers of the neural network model and is typically a vector of floating point/integer elements.

As shown in FIG. 1, each 3D CiM device tier at a tile 40 includes a resistive memory array, e.g., a two-dimensional array 50 of memristive devices in a cross-bar configuration adapted to perform a computational primitive such as an in-place matrix-vector multiply (MVM) operation with $\mathcal{O}(1)$ time complexity by exploiting analog storage capability and Kirchhoff's circuits laws. As an example, at two-dimensional array 50 of memristive devices, the MVM operation can compute an MVM operation $$\begin{bmatrix} A_{11} & A_{12} \\ A_{21} & A_{22} \end{bmatrix} \begin{bmatrix} x_1 \\ x_2 \end{bmatrix} = \begin{bmatrix} b_1 \\ b_2 \end{bmatrix}$$

where $x_1$ and $x_2$ are values of an input data vector and can map to Vin voltage values 52, $A_{11}$-$A_{22}$ values correspond to conductance (resistance) values or "weights" stored at respective memristive devices 51 at the cross-bar array 50 at the tier, and $b_1$ and $b_2$ are output values converted from sensed output currents 53 read out of the array 50 at the tier. Because all of the weights reside in the 3D memory architecture, and computations are performed in-memory, the bottleneck of shuttling data back and forth between the memory and the computational unit is completely eliminated. In embodiments, the 3D CiM cross-bar memory can be sized to correspond to one expert at a single tier. However, a larger expert may require 3D CiM cross-bar memory at more than one tier, e.g., two or more tiers. That is, an expert can span a single tile as well as multiple tiles.

Each 3D CiM device at a tile 40 offers significant weight storage capacity to store millions of parameters per CiM tile at high density, enabling efficient and fast inference (and potentially training) of billion-parameter sized models on a multi-tile CiM accelerator.

In an embodiment, the disclosure proposes to implement large-scale models using the MoE architecture by programming each of the experts into different tiers of the 3D memory.

As used herein, the term "virtual tile" refers to a tile upon which an expert model resides. A virtual tile spans one or more physical tiles 40. Each physical tile 40 has multiple tiers 45 forming a 3D CiM system. As an expert can have multiple neural network layers, these layers are mapped to tiers in different physical tiles. As an example, an expert model with two layers can be mapped to a first tier of a first tile (layer 1) and a first tier of a second tile (layer 2). Additionally, two experts can reside on a virtual tile, e.g., a first expert residing on tier 1 of a first physical tile (e.g., first layer of expert model) and a tier 1 of a second physical tile (e.g., second layer of expert model) and a second expert residing on a second tier, e.g., tier 2, of the first physical tile (e.g., a second expert of one neural network model layer). The output of an expert is transmitted to the next layer.

Given the newly arriving data, a tier(s) of a virtual tile can accordingly be selected to process this data. Generally, when input data (e.g., in the form of hidden layer activations from a previous layer) arrive at the virtual tile, an expert is selected. Depending on the expert index, the method activates the corresponding tiers in each physical tile in the virtual tile. For example, responsive to an input data the expert selection selects expert 1, and then activates tier 1 in both physical tiles. The data is first sent to tier1 in physical Tile 1 and then sent to tier 1 in physical Tile 2. The output of a virtual tile is then sent to the next layer in the neural network.

In the MoE model: given hidden activations h generated at a neural network model layer, the output of an MoE layer is given by $$\hat{h} = \sum_{i=0}^{K-1} g_i(h) \cdot e_i(h)$$

where K is the number of experts, $e_i(h)$ is the output from the ith expert and $g_i$ is the ith gating value. However, as the gating function may route input to a same subset of experts and incur instability/inefficiency, an MoE scheme is implemented where a hash function is applied to the input and a hash is computed on each input token, and not on the hidden state, and an expert index is computed based on the input and a corresponding specific feed-forward network (FFN) is chosen as an expert. That is, an expert is determined a priori using a function $f(x)$: $\hat{h}=\Sigma_{i\in f(x)} g_i(h)\cdot e_i(h)$ is an output, where $f(x)$ is the expert index(indices) ranging from 0 to K−1 determined by applied expert select function $f(\,)$ on the input x.

FIGS. 2A-2E depict operations and the signal/data flow involving example 3D compute-in-memory (CiM) hardware and memory system accelerator 100 at a tier(s) of a virtual tile implementing an MoE neural network model architecture in accordance with an embodiment of the invention.

In embodiments, the compute-in-memory system accelerator 100 configures a plurality of in-memory cores, each in-memory core having more than one tier of in-memory compute cells, and more than one expert residing in tiers. The configuration includes the selection of one or more experts for activation propagation based on a function, e.g., a hash function. In an embodiment, the tiers of the corresponding experts are activated based on this function. That is, MoEs enable selection of a compute path via a function $f(\,)$ and therefore the tiers to be activated are selected a priori. Different tiers hold the weights of different experts and tiers are switched on dynamically depending on the input/intermediate activations.

Figure 2A:
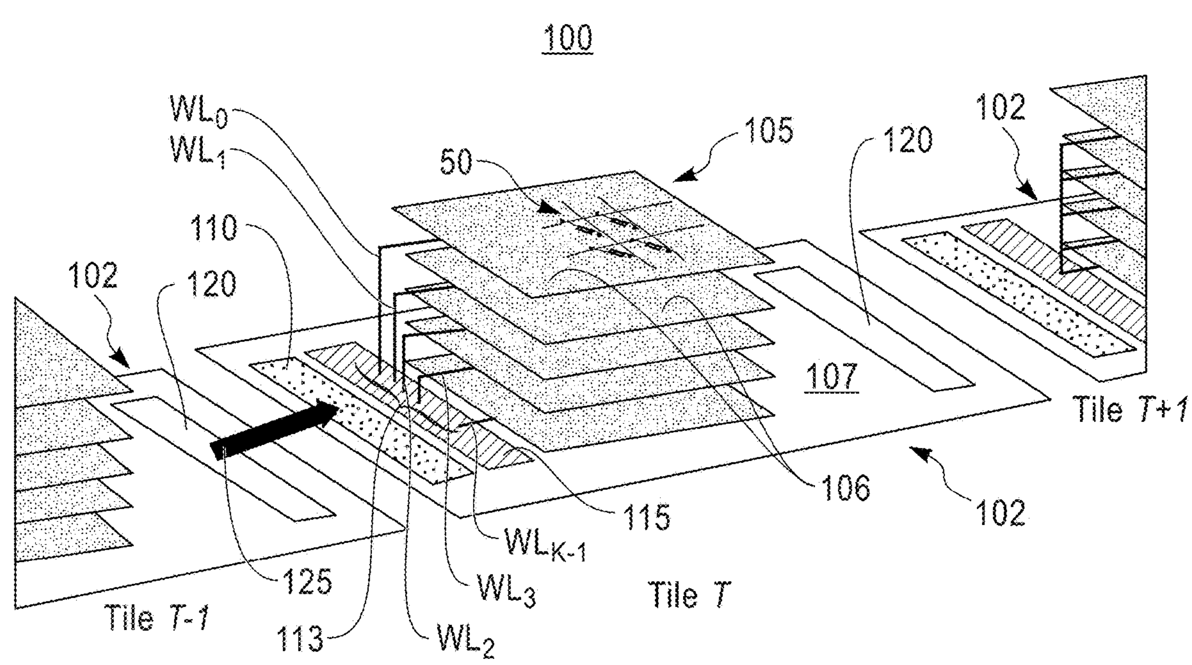
FIGS. 2A-2E depict operations and the signal/data flows involving a tile at a 3D compute-in-memory (CiM) hardware and memory system accelerator tile implementing processes associated with a MoE deep neural network model architecture in accordance with an embodiment of the invention.

FIG. 2A particularly illustrates a compute-in-memory accelerator system 100 comprising tiles having a plurality of in-memory cores employing function-based activation of memory tiers for efficient inference of Mixture of Expert (MoE) models.

In FIG. 2A, CiM accelerator system 100 includes plural tiles 102, each tile corresponding to a successive layer of a deep neural network (DNN). For non-limiting purposes of illustration, FIG. 2A shows a virtual tile including a sequence of tiles T−1, T, T+1. In an embodiment, each tile 102 includes components including: compute-in-memory (CiM) structures forming a 3-dimensional compute-in-memory system 105 used for accelerating deep learning inference and training. Each 3-dimensional compute-in-memory system 105 includes a plurality of memory cell tiers 106, each tier 106 having an addressable 2-dimensional CiM array including a cross-bar configuration of memory cells 50 for handling neural network processes at a particular neural network layer. In an embodiment, a memory cell can store a weight associated with a particular neural network model and/or MoEs. In an embodiment, all of the weights reside in the 3D memory architecture. Because all of the weights reside in the 3D CiM architecture, and the methods perform computations in-memory, the bottleneck of shuttling data back and forth between the memory and a computational unit is completely eliminated. The compute-in-memory accelerator system 100 of FIG. 2A thus enable fast and very energy-efficient inference of models that contain billions of parameters.

As shown in FIG. 2A, in a processing method, a first step is the arrival of data 125 at a tile T at expert selection function logic circuit 110. In an embodiment, input data 125 arrives from another tile/processing block and comprise data "x" including a vector of floating point/integer elements. However, input data 125 can also be a single number (e.g., a vector with a single element). For example, the programmer/user can specify a desire to use a first expert/tier of the MoE model. In an embodiment, input data 125 can be intermediate activations "h" received from a prior layer, i.e., from a same or another tier/processing block. For example, as shown in FIG. 2A, data 125 generated at scaling and accumulate (gating) circuitry 120 at a prior tile T−1 (a prior DNN model layer) is received at expert selection function logic circuit 110 for processing at tile T (e.g., the next DNN model layer).

Figure 2B:
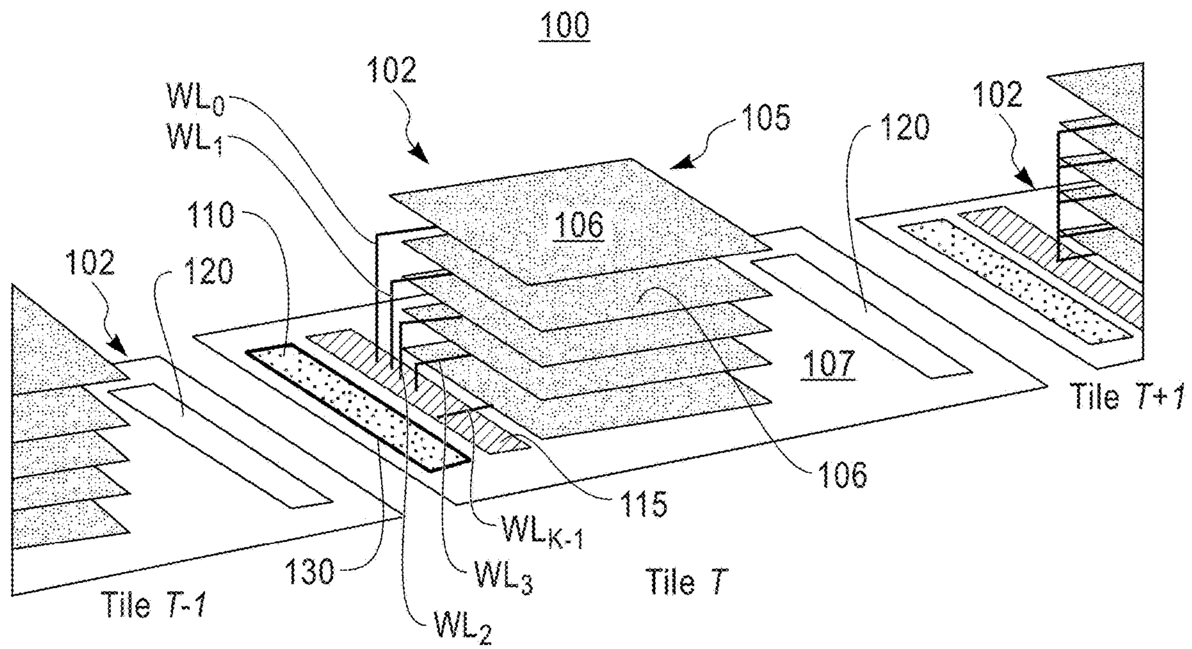

In a second processing step 130, FIG. 2B, at expert selection function circuit 110, an expert selection function $f($ $)$ is executed. Execution of expert selection function $f($ $)$ results in generating one or more expert indices and corresponding gating values. The expert indices are used as input to a corresponding tier activation circuit 115 used to generate a wordline signal used to select a particular CiM tier 106 of a determined expert model. That is, in CiM accelerator system 100, associated with the CiM structure 105 at a tile 102 is an associated tier activation circuit 115 that is based on word line drivers (WLD) 113, e.g., shown as word line drivers $WL_0$, $WL_1$, . . . , $WL_{K-1}$, that connect to corresponding memory tiers 106 for activating a corresponding memory tier(s) to process received inputs. As a tier can be associated with a different MoE model, different tiers 106 can hold the weights of different experts.

The tier activation circuit 115 includes functions for dynamically switching (activating) a tier. For example, tiers are dynamically switched on depending on the input x/intermediate activations h received. In an embodiment, a MoEs model enables selection of a compute path via an expert selection function "$f$" circuit 115 implementing logic for selecting/activating CiM tiers 106. In an embodiment, expert selection function "$f$" circuit 115 implements logic that can select and activate a tier(s) a priori. One example of this function "$f$" is a hash function. Another example of $f(x)$ can be a softmax function, followed by an argmax function as follows:

argmax(softmax($x$*fixed_weight_matrix)).

where the fixed weight matrix is a matrix that was learned in a different process, e.g., is fixed in the sense that it is determined before training the model. As an example, a multi-layer neural network can use multiple weight matrices chained by some non-linearity.

As further shown in system 100, associated with the CiM system 105 at a processing tile 102 is peripheral circuitry 107 and gating circuitry 120 that can function to scale and accumulate DNN model layer outputs. Peripheral circuitry 107 can include analog/digital converters, digital/analog converters, registers, memory, buffers, filters, etc. for carrying out neural network processing operations at the tile.

Figure 2C:
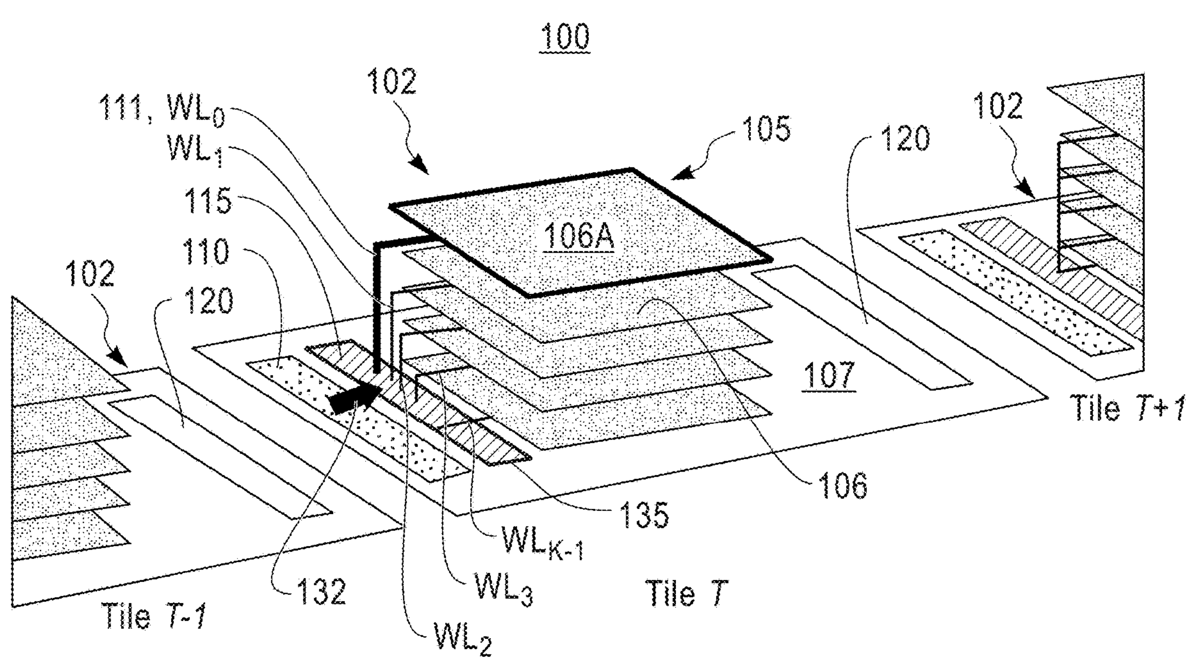

Thus, as shown in a third processing step 135, FIG. 2C, based on the expert indices 132 from the expert selection function logic circuit 110, the tier activation circuitry 115 activates the tier of interest. For example, responsive to inputs 132, as shown in FIG. 1C, the memory tier wordline $WL_0$ 111 is set to a high voltage value to activate an expert model at a corresponding CiM memory tier 106A for use in computing and generating model layer output activations.

Figure 2D:
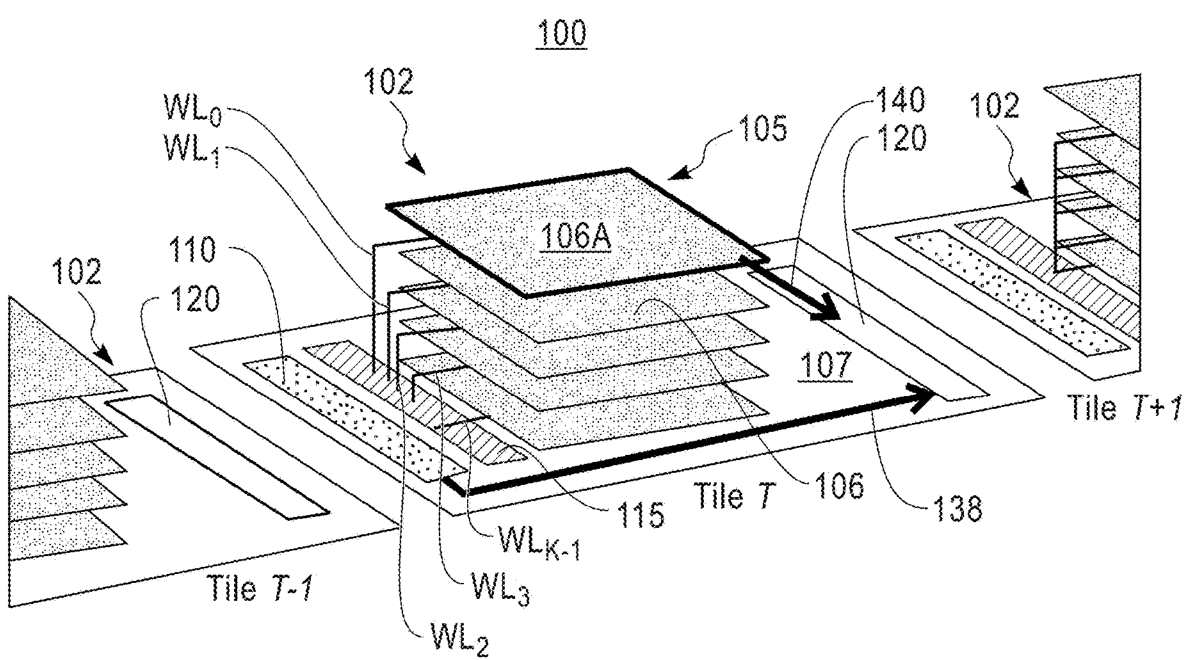

FIG. 2D depicts a fourth processing step in system 100 in which a gating circuitry 120 receives a gating value 138 generated at the expert selection function logic circuit 110 and the intermediate output activations 140 that have been analog-to-digitally converted. Gating circuitry 120 performs processes using gating value 138 to scale and then accumulate the model layer outputs at the expert at a tier, e.g., tier 106A.

Figure 2E:
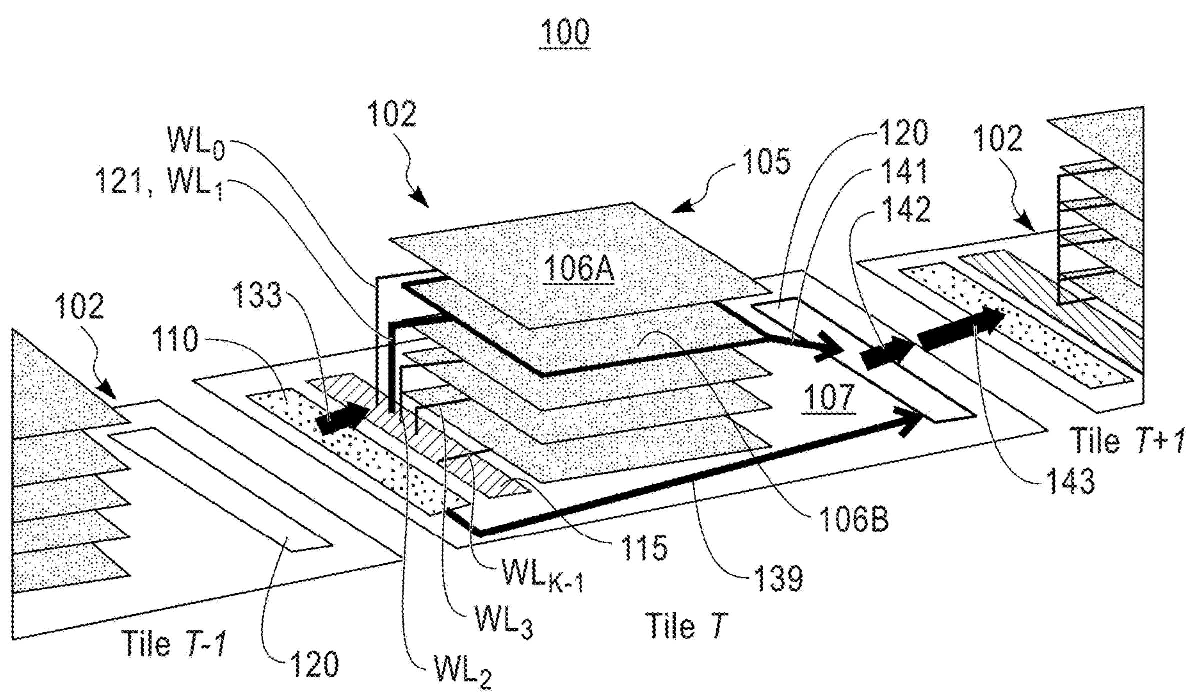

Further processing steps are executed in a similar manner to choose other experts in the MoE model. For example, as shown in FIG. 2E, based on further input 133 from the expert selection function logic circuit 110, the tier activation circuitry 115 activates another (second or further) tier of interest. For example, as shown in FIG. 2E, the memory tier wordline $WL_1$ 121 corresponding to a second CiM memory tier 106B is set to a high voltage to activate the tier 106B and generate further intermediate output activations 141. In each further processing step, shown in FIG. 2E, a gating value 139 generated at the expert selection function logic circuit 110 is applied to the output activations 141 having been subject to analog-to-digital conversion. This result is accumulated at gating circuitry 120 that scales and accumulates this model layer output. In an embodiment, tiers 106A, 106B can be associated with the same MoE expert or different experts.

After all other chosen experts are executed in a similar fashion depicted in FIGS. 2A-2E, the intermediate output activations 142 are calculated and the activations are navigated to the next network layer which might reside on one or multiple tiles, e.g., communicated to the next virtual tile T+1 102 as input activations 143 for processing at a subsequent neural network layer.

Figure 3:
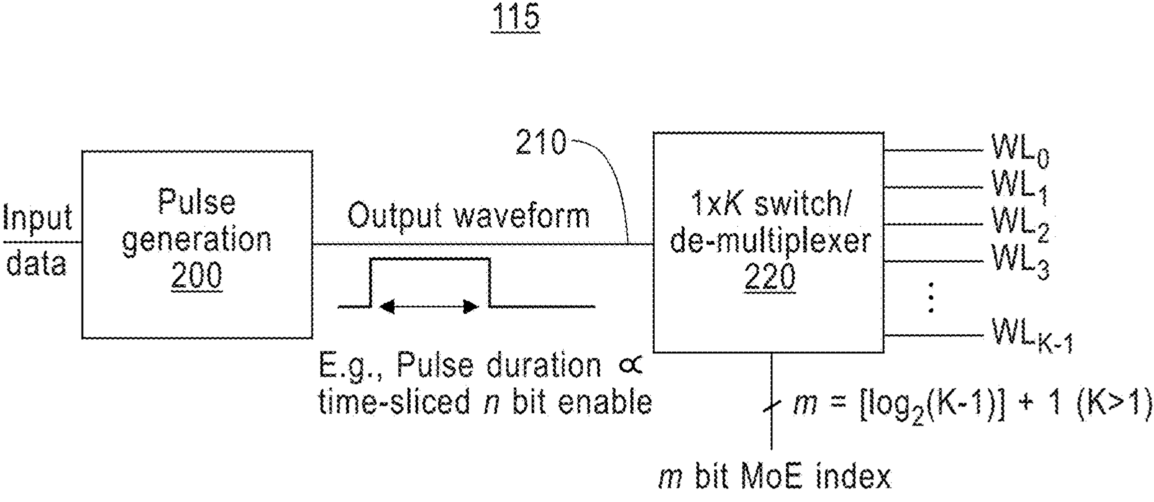
FIG. 3 shows one embodiment of a tier activation circuit that selects word lines by generating wordline (WL) signals for activating CiM memory tiers corresponding to a selected expert of the MoE model, the selected expert of the MoE model residing on a single or multiple tiers.

FIG. 3 shows one embodiment of the tier activation circuitry 115 that generates wordlines WL for activating CiM memory tiers 106 corresponding to an expert of the MoE model. In an embodiment, tier activation circuitry 115 includes a pulse generation circuit 200 that generates word line pulses $WL_0$, $WL_1$, . . . , $WL_{K-1}$ of a duration or amplitude commensurate with the input data. In an embodiment, a wordline (WLD) pulse 210 is generated for a matrix-vector multiplication operation in the tier activation logic applied at tier activation circuitry 115.

In an embodiment, pulse generator circuit 200 is configured to receive a digital input data (e.g., a floating point/integer number) and convert it into a waveform, which serves as the input for an analog matrix-vector multiplication. In an example, the duration of the waveform 210 represents the input number. As a non-limiting example, assuming that the input number can take values between 0 and 128 and the maximum duration possible is 128 ns, then, the number 64 can be represented as a pulse with a fixed amplitude and 64 ns duration. An alternative is to modulate the amplitude with a fixed duration. Assume the amplitude can be modulated between 0V and 0.5V. Then, the number 64 can be represented with a pulse amplitude of 0.25V.

In operation, pulse generation circuit 200 receives input data, e.g., a vector of values, and generates an output waveform pulse 210. In an example, the output waveform pulse 210 is of a pulse duration proportional to the time-sliced n bit enable. Output waveform pulse 210 is input to a 1×K switch/de-multiplexer 220 which asserts the word line signal $WL_0, WL_1, \ldots, WL_{K-1}$ based further on a value m-bit MoE index determined by the following:

$$m=\lfloor \log_2(K-1)\rfloor+1(K>1)$$

where K is the number of selectable CiM tiers in the 3D memory. In an embodiment, the m-bit MoE index is the output of function f(x). For example, assuming there are six (6) experts, each on a different tier, then, a 3-bit index is sufficient to represent each expert. Index value 000 would translate to expert 0, index value 001 would translate to expert 1, . . . , and index value 101 would translate to expert 5. The m-bit MoE expert index value controls the switch/demultiplexer 220 to select which of the word lines WL associated with individual tiers receive the generated pulse 210 and the output waveform is applied to that word line. In the case the expert selection function $f$ logic circuit 110 outputs multiple indices, each matrix-vector multiplication is performed sequentially.

Figures 4, 5:
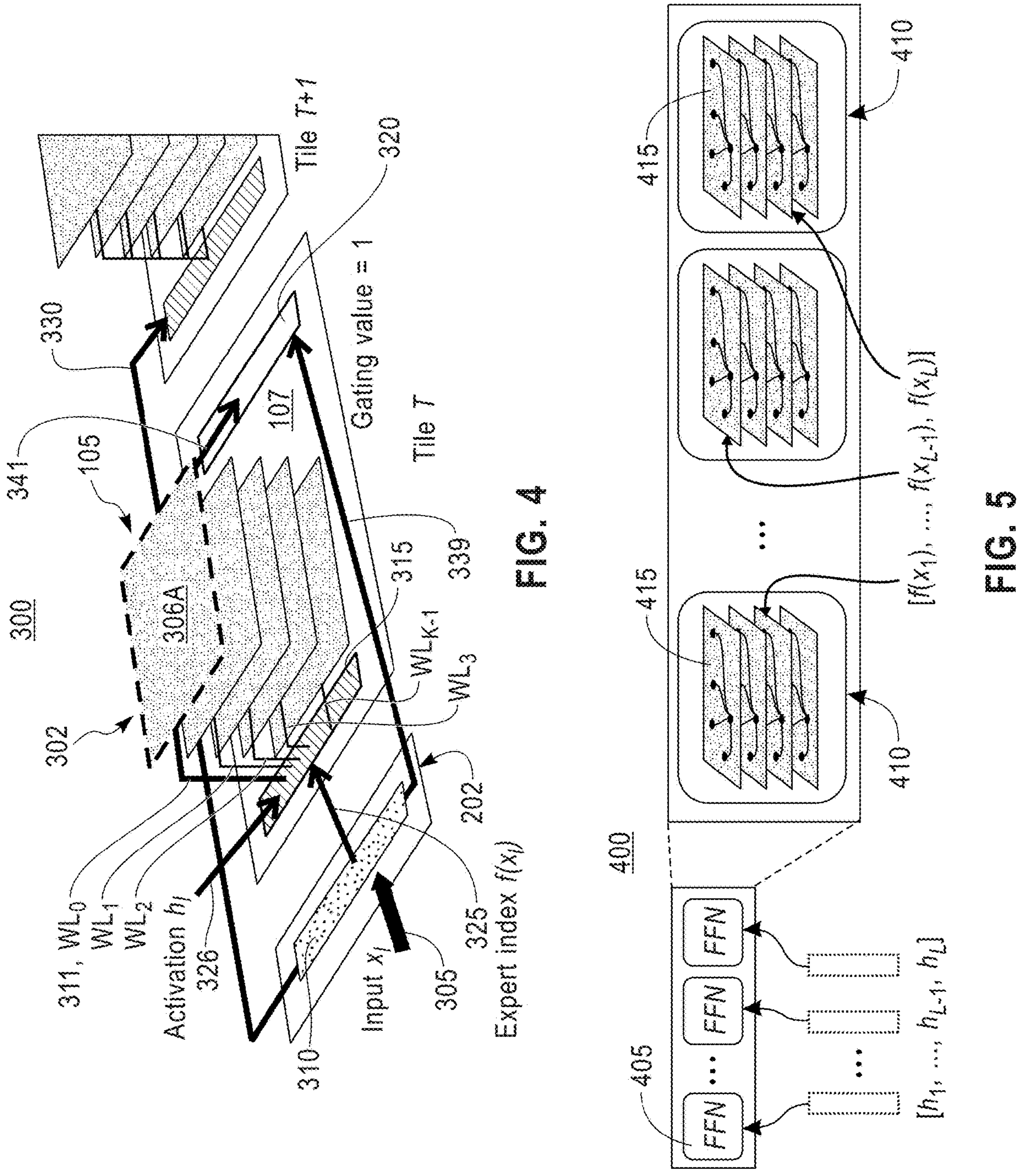
FIG. 4 depicts a first embodiment of a 3D CiM accelerator system configured for selecting a single expert(s) with input-based MoEs for single- or multiple-tier activation.
FIG. 5 conceptually depicts the processing at the CiM accelerator system for selecting a single expert(s) with input-based MoEs for single tier activation.

With reference to FIG. 4, in a first embodiment, a 3D CiM accelerator system 300 is configured for selecting a single expert(s) with input-based MoEs for single tier or multiple tier activation. In this input-based MoE embodiment, the input to the model is used/processed to define which experts/tiers will be active. The input to the model is received at the beginning of the model inference and therefore, the experts/tiers for all layers can be determined in advance if desired. In an embodiment, it is assumed there is a single expert that is activated per layer.

As shown in FIG. 4, an arbitrary processing block 310, e.g., at a virtual tile 202, is shown receiving input sequence $x_l$ 305 which block is an arbitrary implementation of expert selection or hash function $f(x_l)$. The block 310 receives sequence $x_l$ as input and produces outputs $f(x_l)$ 325. The block can perform this either in analog or in digital domain. The arbitrary processing block 310 can be a part of the virtual tile 302 or can physically reside in another part of the accelerator system 300. Tier activation circuitry 315 at tile T 302 associated with a neural network layer receives outputs $f(x_l)$ and corresponding received activations $h_l$ 326 received from a previous network model layer to generate a wordline signal, e.g., wordline 311, to activate a tier or multiple tiers associated with an MoE expert for generating further output activations 341.

FIG. 5 conceptually depicts the processing at the CiM accelerator system 300 for selecting a single expert(s) with input-based MoEs for single tier activation. In FIG. 5, there is shown an MoE experts system 400 as multiple feed-forward neural network models 405 activated in response to receipt of intermediate activations sequence $[h_1, h_2, \ldots, h_L]$ that are received at the layer. Which FFN (expert) is selected is determined by f(x), i.e., the input into the neural network (and not the hidden layer activations). Each FFN model is a 3D CiM structure 410 consisting of tiers 415 of memory cells. At arbitrary processing block 310 that receives an input sequence $x=[x_1, x_2, \ldots, x_L]$, wherein $L\in\mathbb{N}_{\geq 1}$ (N is a natural number greater than or equal to 1), the function $f$ is applied to the input sequence x to produce a single value (hard select) 420 for selecting a single expert/tier. In an embodiment, given input sequence $x=[x_1, x_2, \ldots, x_L]$, there is produced a sequence of indices $[f(x1), f(x2), \ldots, f(xL)]$ and there is produced corresponding gating values $[g_{f(x1)}(h1), g_{f(x2)}(h2), \ldots, g_{f(xL)}(hL)]=[\{1\}, \{1\}, \ldots, \{1\}]$, i.e., all produced gating values are equal to 1. Here, $x\in\mathbb{R}^d$, and $f(x)\in\mathbb{N}_{\geq 0}$.

Referring back to FIG. 4, the expert index 325 is determined based on the input $x_l$ for all tiles, e.g., Tile T+1, i.e., the same arbitrary processing block 310 determines the expert indices for all virtual tiles (e.g., tile T, tile T+1, etc.) and a data flow 330 of expert indices is communicated from arbitrary processing block 305 to the tier activation circuitry 315 at the other tiles, e.g., tile T+1. However, alternative implementations are possible, e.g., the input sequence x can be provided to all physical tiles of the virtual tile simultaneously and each physical tile can determine its own active tier. As further shown in FIG. 4, in an example, received expert index 325 based on the input $x_l$ is used to activate an expert model at a tier, e.g., tier 306A that processes the data and any activations and generates further intermediate output activations 341. Further shown in FIG. 4 is the corresponding generated gating value (=1) 339 generated by expert selection function logic at the arbitrary processing block 310 for application to the output activations 341 after they are analog-to-digitally converted. This result is accumulated at gating circuitry 320 that scales and accumulates this model layer output.

Figures 6, 7:
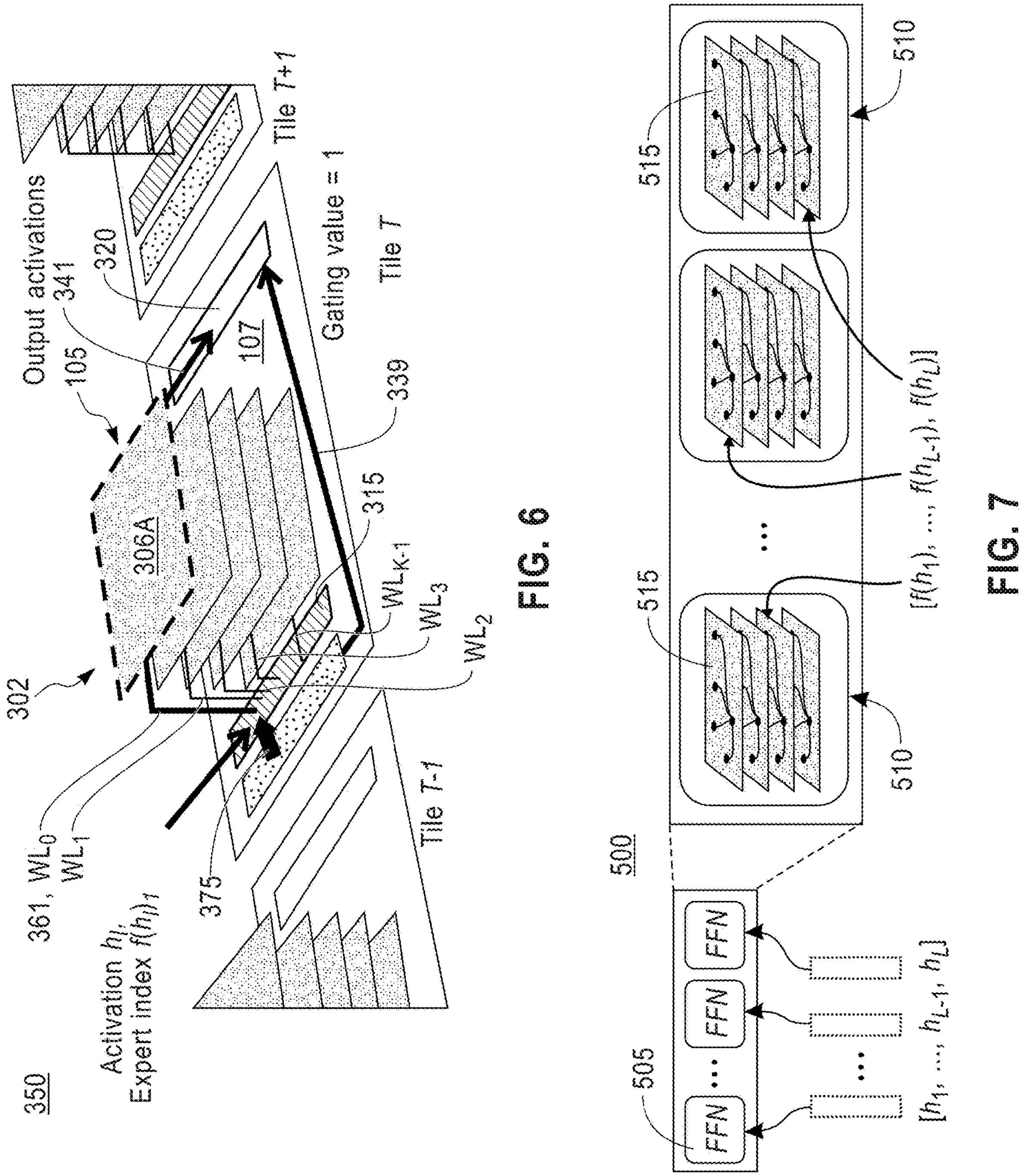
FIG. 6 depicts a second embodiment of a 3D CiM accelerator system configured for selecting a single expert(s) with layer-activation-based MoEs for single tier activation.
FIG. 7 conceptually depicts the processing at the CiM accelerator system of FIG. 6 for selecting a single expert(s) with layer-activation-based MoEs for single tier activation.

With reference to FIG. 6, in a second embodiment, a 3D CiM accelerator system 350 is configured for selecting a single expert(s) with layer-activation-based MoEs for single tier activation. In this layer-activation-based MoE embodiment, the activations received from the previous layer, is used/processed to determine which experts/tiers will be active. In this embodiment, the expert indices are calculated dynamically/on-the-fly; or in other words, they are not known before the previous layer is executed. In an embodiment, it is assumed there is a single expert that is activated per layer.

As shown in FIG. 6, an expert selection function logic processing block 360 is shown generating an expert index or selection based on a received activations sequence $h=[h_1, h_2, \ldots, h_L]$. Specifically, an expert index 361 is generated in response to applying a hash function $f$ to the sequence of activations, i.e., $f(h_l)$. The tier activation block 315 at tile T 302 associated with a neural network layer receives sequence of activations $h_l$ and the sequence $f(h_l)$ 375 generated at expert selection function logic processing of the corresponding received activations $h_l$ received from the previous layer to generate a wordline signal, e.g., wordline 361, to activate a tier, e.g., tier 306A, associated with an MoE expert for generating further output activations 341.

FIG. 7 conceptually depicts the processing at the CiM accelerator system 350 of FIG. 6 for selecting a single expert(s) with layer-activation-based MoEs for single tier activation. In FIG. 7, there is shown an MoE experts system 500 as multiple feed-forward neural network models 505 activated in response to receipt of intermediate activations sequence $[h_1, h_2, \ldots, h_L]$. Each FFN model is a 3D CiM structure 510 consisting of tiers 515 of memory cells.

In the embodiment of FIGS. 6 and 7, the applied expert selection function $f$ produces a single value (hard select) 520 to select one expert/tier. Given the layer outputs of the previous layer denoted as $[h_1, h_2, \ldots, h_L]$, where $L\in\mathbb{N}_{\geq 1}$, expert selection function logic processing block 360 produces a sequence of indices $[f(h1), f(h2), \ldots, f(hL)]$ and corresponding gating values $[g_{f(h1)}(h_1), g_{f(h2)}(h2), \ldots, g_{f(hL)}(h_L)]=[\{1\}, \{1\}, \ldots, \{1\}]$, i.e., all produced gating values are equal to 1. Given the activations from the previous layer, there is chosen the specific expert (tier in the 3D architecture) based on $[f(h1), f(h2), \ldots, f(hL)]$. Here, $h \in \mathbb{R}^m$ and $f(h) \in \mathbb{N}_{\geq 0}$.

Referring back to FIG. 6, the expert index 375 is determined based on the previous layer activations $h_l$ for the current tile, e.g., Tile T. This expert index 375 is used to activate an expert model at a tier, e.g., tier 306A that processes the data and any activations and generates further intermediate output activations 341. Further shown in FIG. 6 is the corresponding generated gating value (=1) 339 generated at the expert selection function logic processing block 360 for application to the output activations 341 after they are analog-to-digitally converted. This result is propagated to and accumulated at gating circuitry 320 that scales and accumulates this model layer output.

Figure 8A:
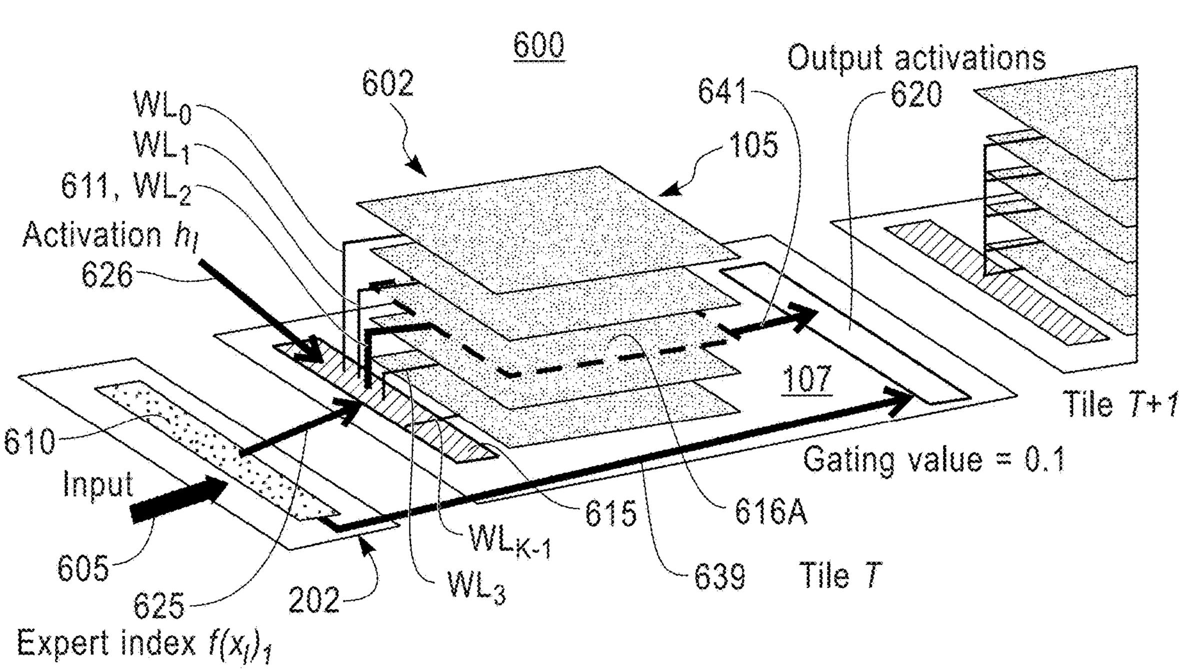
FIGS. 8A and 8B depict a further embodiment of a 3D CiM accelerator system configured for selecting multiple experts with input-based MoEs for single tier activation.
Figure 8B:
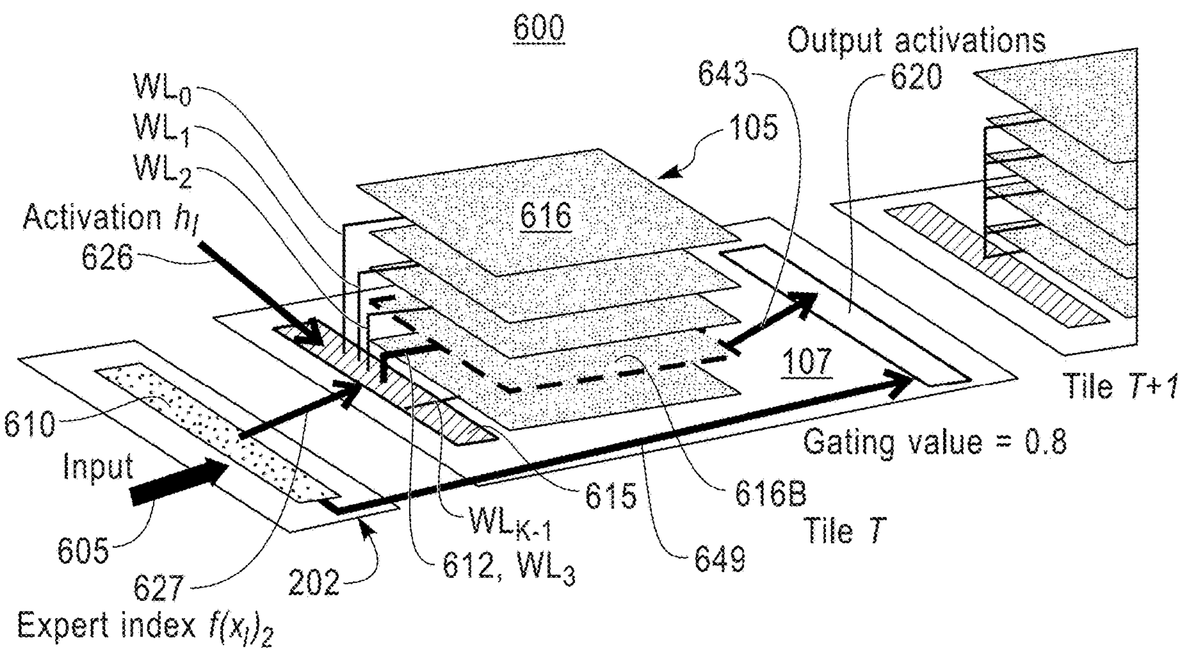

FIGS. 8A and 8B depict a further embodiment of a 3D CiM accelerator system 600 configured for selecting multiple experts with input-based MoEs for single tier activation. In this input-based MoE embodiment, the input to the model is used/processed to define multiple experts/tiers that will be active. The input to the model is received at the beginning of the model inference and therefore, the experts/tiers for all layers can be determined in advance if desired. In an embodiment, more than one tier/expert is utilized in each tile. Each of the experts contribute to the output of the tile, proportional to its gating value. Which tiers/experts will be used for the layer is determined according to the model input.

As shown in FIG. 8A, an arbitrary processing block 610, e.g., at a virtual tile 202, is shown receiving input sequence $x_l$ 605 which block is an arbitrary implementation of expert selection or hash function $f(x_l)$. The block 610 receives sequence $x_l$ as input and outputs respective sequence of expert indices $f(x_l)$ 625 where $l=1, 2, \ldots, L$. The block can perform this either in analog or in digital domain. The arbitrary processing block 610 can be a part of the same physical tile 602 or can physically reside in another part of the accelerator system 600. Tier activation circuitry 615 at tile T 602 associated with a neural network layer sequentially receives outputs $f(x_l)$ and activations $h_l$ 626 received from a prior iteration (activations h received from a prior layer of the model) to generate corresponding tier activation wordline signals. For example, in response to a first generated expert indice, e.g., $f(x_l)_1$, tier activation circuit 615 generates a first wordline signal, e.g., wordline 611 (e.g., $WL_2$), to activate a first tier associated with a first MoE expert, e.g., tier 616A shown in FIG. 8A for processing/generating further output activations 641. Further shown in FIG. 8A is the corresponding generated gating value 639 generated by expert selection function logic in response to the first input $x_1$ of the input sequence received at the arbitrary processing block 610 for application to the output activations 641 after they are analog-to-digitally converted. This result is propagated to and accumulated at gating circuitry 620 that scales and accumulates this model layer output. In the embodiment depicted in FIGS. 8A, 8B, the generated output activations that are scaled and accumulated at gating circuitry 620 are transmitted to a next tier at physical tile 602 to be activated based on the next expert index, i.e., $f(x_2)$, generated in response to the second input $x_2$ of the input sequence received at the arbitrary processing block 610. That is, in this embodiment, received expert indices 625 based on a current input sequence $x_l$ is used to sequentially activate the expert models at one or more tiers to process the current input data. In an embodiment, the same inputs are passed through a different expert/tier. The processing at the tier generates further intermediate output activations 641 to be scaled, accumulated with a previous output, and stored for use in a next iteration of the input sequence.

Thus, in a next processing sequence of sequentially activating the expert models at one or more tiers as shown in FIG. 8B, in response to a next (e.g., second) of the generated expert indices, i.e., $f(x_l)_2$, tier activation circuit 615 generates a next wordline signal, e.g., wordline 612 (e.g., $WL_3$), to activate a further tier associated with a second MoE expert, e.g., tier 616B shown in FIG. 8B for processing/generating further intermediate output activations 643. Further shown in FIG. 8B is the corresponding generated gating value 649 generated by expert selection function logic in response to the second input $x_2$ of the input sequence received at the arbitrary processing block 610 for application to the output activations 643 after they are analog-to-digitally converted. This result is propagated to and accumulated at gating circuitry 620 that scales, accumulates and stores this model layer output. Thus, at a layer L, the input x_1 produces activations $(h\_\mathbf{1})^L$. The experts for processing $(h\_\mathbf{1})^L$ are determined based on x_1. For example, at given experts 1 and 2 are selected. $(h\_\mathbf{1})^L$ is then first passed through expert 1. The result is multiplied by the gating value and is stored. The same activations $(h\_\mathbf{1})^L$ are then passed through expert 2. The result of that is multiplied by the corresponding gating value and added to the stored output. The final output is then sent to the next layer/tile.

In this further embodiment, processes depicted in FIGS. 8A, 8B, are iterative, i.e., and are repeated for as many experts/tiers as required by the input sequence $x_l$ and the expert selection function logic applied at arbitrary processing block 610. At each iteration, the generated output activations that are scaled and accumulated at gating circuitry 620 are sent to a next tier at a tile 602 or another physical tile of the virtual tile, the next tier being activated based on the next expert index of the output sequence of indices, i.e., $f(x_l)$, generated in response to the input $x_l$ of the input sequence received at the arbitrary processing block 610. Further, in this embodiment, the gating values are determined in the expert selection function logic. A non-limiting example of a gating function is:

softmax(input*fixed_weight_matrix)

where the fixed_weight_matrix represents a matrix that was learned in a different process.

In this further embodiment depicted by iterative processes shown in FIGS. 8A, 8B, for each input x, the expert selection logic function $f(x)$ produces a list of values (soft select) to select multiple experts/tiers. As an illustrative, non-limiting example, expert selection logic function $f(x)$ generates an example output as follows:

$f(x)=[\{2,3\}]$ with gating function outputting: $g_{\{2,3\}}(h)=[\{0.1, 0.8\}]$ indicating that for processing the activations h, two experts 2 and 3 are selected with respective weighting coefficients=0.1 for the output of expert 2 (processing shown in FIG. 8A) and weighting coefficient=0.8 for the output of expert 3 (processing shown in FIG. 8B). Thereafter, the method computes output activations as $\hat{h}=\Sigma_{i \in f(x)} g_i(h) \cdot e_i(h)$.

In this embodiment, given an input sequence $[x_1, x_2, \ldots, x_L]$, expert selection function logic computes $[f(x1), f(x2), \ldots, f(xL)]$, expert indices $[e_{f(x1)}(h1), e_{f(x2)}(h2), e_{f(xL)}(hL)]$, and respective gating (weight) values $[g_{f(x1)}(h1), g_{f(x2)}(h2), g_{f(xL)}(hL)]$) with L being the sequence length and hl being the input activations 626 from the prior layer. In such an embodiment, when a single 3D CiM accelerator system tile is used, the system feeds the input activations h 626 into the j-th tier 616 e.g., through a different expert, and adds the weighted output to the already computed output 658 of the physical tile.

Figure 9:
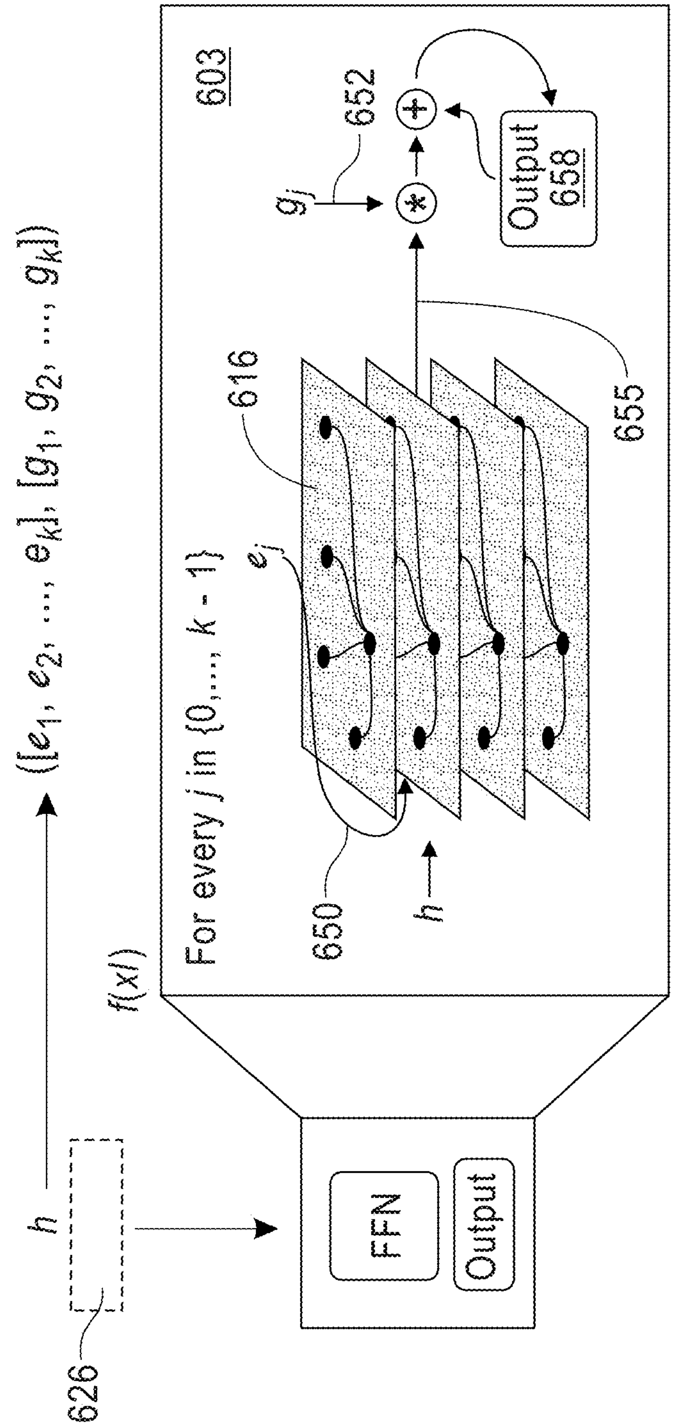
FIG. 9 depicts a multi-expert 3D CiM accelerator system tile including a stack of CiM tiers implementing one or more expert models corresponding to a MoE feed-forward network (FFN)

The multi-expert 3D CiM accelerator system tile 603 shown in FIG. 9 depicts a stack of CiM tiers 616 implementing one or more expert models corresponding to a MoE FFN. At tile 603, the iterative processing of a given single input $x_l$, where l=1, 2, . . . , k, includes applying the function $f$(xl) and uses input activations hl to produce an expert index $e_j$ 650 used to activate a j-th tier 616 (where j=0, 1, . . . k−1). The j-th tier includes an MoE expert model determined according to $e_{f(xl)}$(hl). The applied function $f$(xl) and input activations hl further produce a corresponding output weight or gating value $g_j$ 652 determined according to $g_{f(xl)}$(hl). At a first iteration, a tier output 658 of the tile is initialized as a vector of zeros. For every value of $f$(xl)=[{$f$(xl)1, $f$(xl)2, . . . }], the system activates the corresponding j-th tier (0 to k−1) and passes the input through the layer for processing to obtain a respective output 655. This output 655 is multiplied with the corresponding gating value $g_j$ and added to the memory of the tile 603. Finally, the system returns the accumulated output 658 of the physical tile. Once iterating through the sequence $x_l$, the scaled, accumulated and stored output activations 658 can be communicated to a next layer of the model for further processing.

Figures 10A, 10B:
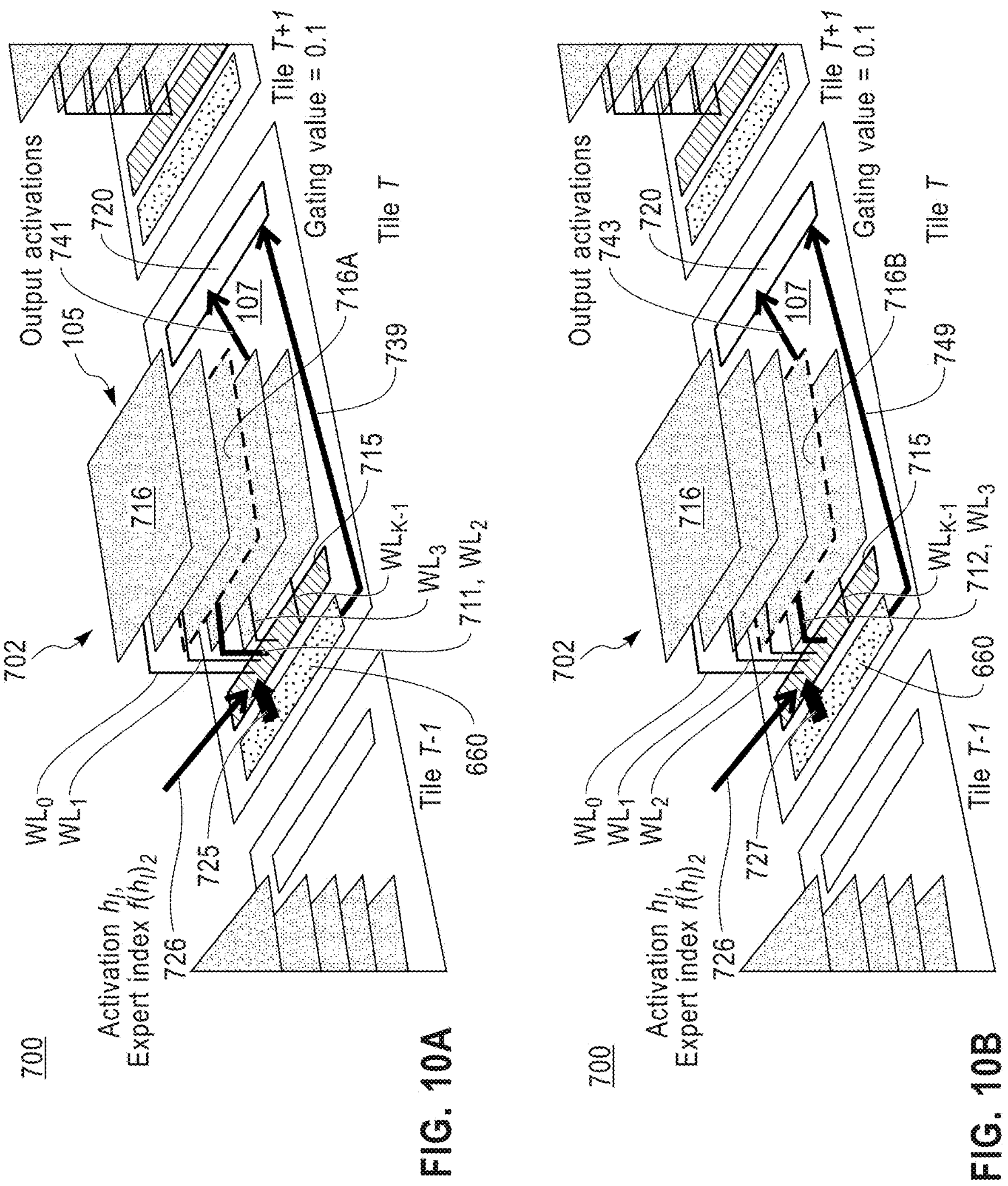
FIGS. 10A and 10B depict a further embodiment of a 3D CiM accelerator system configured for selecting multiple experts with activation-based MoEs for single tier activation.

FIGS. 10A and 10B depict a further embodiment of a 3D CiM accelerator system 700 configured for selecting multiple experts with activation-based MoEs for single tier activation. In this activation-based MoE embodiment, the activations received from the previous layer, is used/processed to determine which experts/tiers of tile 702 will be active. In this embodiment, the expert indices are calculated dynamically/on-the-fly; i.e., they are not known before the previous layer is executed. In an embodiment, a single expert is activated per layer. In an embodiment, more than one tier/expert is utilized in each tile. Each of the experts contribute to the output of the tile, proportional to its gating value. Which tiers/experts will be used for the layer is determined according to the input activations.

As shown in FIG. 10A, an expert selection function logic processing circuit 660 at tile 702 is shown generating an expert index or selection based on a set of received activations sequence h=[$h_1$, $h_2$, . . . , $h_L$], e.g., resulting from processing at a prior layer. Specifically, a first expert index 711 is generated in response to applying a hash function $f$ applied to the sequence of activations, i.e., $f(h_l)$. The tier activation block 715 at tile T 702 associated with a neural network layer receives sequence of activations $h_l$ and the sequence $f(h_l)$ 725 based on corresponding received activations $h_l$ generated at expert selection function logic processing of the corresponding received activations $h_l$ received from the previous layer to generate a first wordline signal 711. This signal 711 activates a tier, e.g., tier 716A, associated with an MoE expert for generating a first set of output activations 741.

For example, in response to a first generated expert indices, e.g., $f(h_l)_1$, tier activation circuit 715 generates a first wordline signal, e.g., wordline 711 (e.g., $WL_2$), to activate a first tier associated with a first MoE expert, e.g., tier 716A shown in FIG. 10A CiM stack 105 for processing/generating further output activations 741. Further shown in FIG. 10A is the corresponding generated gating value 739 generated by expert selection function logic in response to the first input $h_1$ of the input activations received at the expert selection function logic processing block 660 for application to the output activations 741 after they are analog-to-digitally converted. This result is propagated to and accumulated at gating circuitry 720 that scales and accumulates this model layer output. In the embodiment depicted in FIGS. 10A, 10B, the generated output activations that are scaled and accumulated at gating circuitry 720 are transmitted to a next tier at tile 702 to be activated based on the next expert index, i.e., $f(h_2)$, generated in response to the second input activation $h_2$ of the input sequence received at expert selection processing block 660. That is, in this embodiment, received expert indices 725 based on a current input activations sequence $h_l$ are used to sequentially activate the expert models at one or more tiers to process a current set of generated activations received from a memory storing the output (not shown) activations results of the immediately prior iteration processing of the sequence $h_l$. The processing at the tier generates further intermediate output activations 741 to be scaled, accumulated and stored for use in a next iteration of the input activations sequence. If an expert spans across multiple tiers, i.e., layer1 of the expert1 resides on tier 1 and 2, then the output from tier 1 are fed back into tier 2 of the same physical tile. The output of tier 2 is then scaled with the gating value and then stored.

Thus, in a next processing sequence of sequentially activating the expert models at one or more tiers as shown in FIG. 10B, in response to a next (e.g., second) of the generated expert indices, i.e., $f(h_l)_2$, tier activation circuit 715 generates a next wordline signal, e.g., wordline 712 (e.g., $WL_3$), to activate a further tier associated with a second MoE expert, e.g., tier 716B shown in FIG. 10B for processing/generating further intermediate output activations 743 for use in the next iteration of the input activations sequence (e.g., next input $h_1$). Further shown in FIG. 10B is the corresponding generated gating value 749 generated by expert selection function logic in response to the second input activations set $h_2$ received at expert selection processing block 660 for application to the output activations 743 after they are analog-to-digitally converted. This result is propagated to and accumulated at gating circuitry 620 that scales and accumulates this model layer output.

In this further embodiment, processes depicted in FIGS. 10A, 10B, are iterative, i.e., and are repeated for as many experts/tiers as required by the input activations sequence $h_l$ and the expert selection function logic applied at processing block 660. At each iteration, the generated output activations that are scaled, accumulated and stored at gating circuitry 620 can be transmitted to a next tier at a tile 602 or another physical tile, the next tier being activated based on the next expert index of the output sequence of indices, i.e., $f(h_l)$, generated in response to the input activations $h_1$ of the input sequence received expert selection processing block 660. Further, in this embodiment, the gating values are determined in the expert selection function logic. A non-limiting example of a gating function is:

softmax(input*fixed_weight_matrix)

where the fixed_weight_matrix represents a matrix that was learned in a different process.

In this further embodiment depicted by iterative processes shown in FIGS. 10A, 10B, for each input activation h, the expert selection logic function $f$(h) produces a list of values (soft select) to select multiple experts/tiers. As an illustrative, non-limiting example, expert selection logic function $f$(h) generates an example output as follows:

$$f(x)=[\{2,3\}]$$

with gating function outputting: $g_{\{2,3\}}(h)=[\{0.1, 0.8\}]$ indicating that for processing the activations h, two experts 2 and 3 are selected with respective weighting coefficients=0.1 for the output of expert 2 (processing shown in FIG. 10A) and weighting coefficient=0.8 for the output of expert 3 (processing shown in FIG. 10B). Thereafter, the method computes output activations as $\hat{h}=\Sigma_{i\in f(x)}g_i(h)\cdot e_i(h)$.

In a further embodiment, the 3D CiM accelerator system implements multiple models that reside on different tiers.

Figures 11, 12:
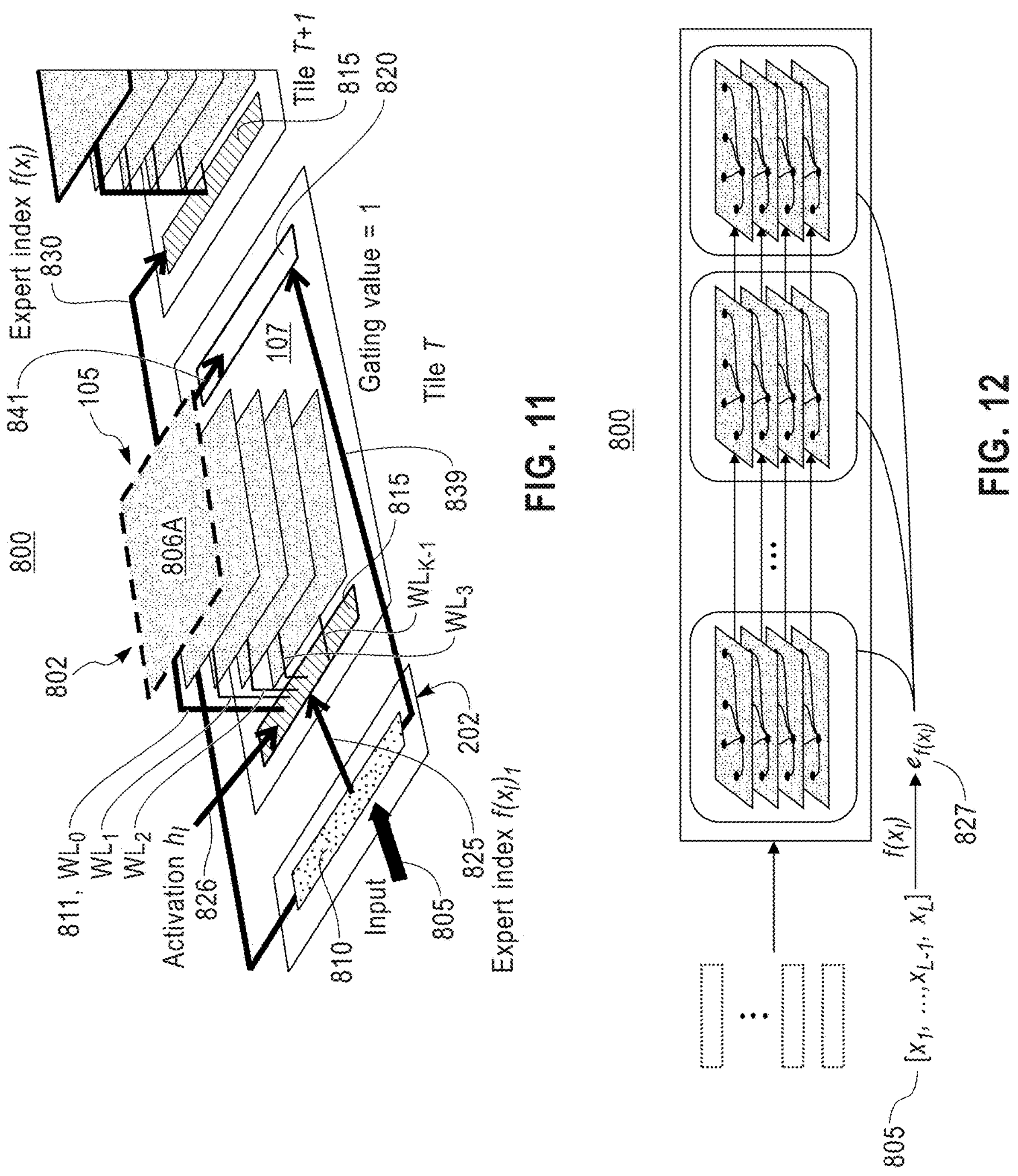
FIG. 11 depicts an embodiment of a 3D CiM accelerator system implementing multiple different models and is configured for selecting a single model of a multi-model system.
FIG. 12 conceptually depicts the processing at the multi-model 3D CiM accelerator system of FIG. 11 for selecting a single model of the multi-model system.

With reference to FIG. 11, in a further embodiment, a 3D CiM accelerator system 800 implements multiple different models and is configured for selecting a single expert(s) of the multi-model system. In this input-based multi-model system, the input to the model is used/processed to define which experts/tiers will be active. The input to the model is received at the beginning of the model inference and therefore, the experts/tiers for all layers can be determined in advance if desired. In an embodiment, it is assumed there is a single model that is activated per layer.

As shown in FIG. 11, an arbitrary processing block 810, e.g., at a virtual tile 202, is shown receiving input sequence $x_l$ 805 which block is an arbitrary implementation of expert selection or hash function $f(x_l)$. The block 810 receives sequence $x_l$ as input and outputs $f(x_l)$ 825. The block can perform this either in analog or in digital domain. The arbitrary processing block 810 can be a part of the tile 802 or can physically reside in another part of the accelerator system 800. Tier activation circuitry 815 at tile T 802 associated with a neural network layer receives outputs $f(x_l)$ and corresponding received activations $h_l$ 826 resulting from processing at a prior neural network model layer to generate a wordline signal, e.g., wordline 811, to activate a tier, e.g., tier 806A. associated with a model for generating a model output, e.g., output activations 841.

FIG. 12 conceptually depicts the processing at the multi-model 3D CiM accelerator system 800 of FIG. 11 for selecting a single expert(s) of the multi-model system. In FIG. 12, there is shown the multi-model 3D CiM accelerator system 800 in which a single model is activated in response to receipt of an input data sequence $x_l=[x_1, x_2, \ldots, x_L]$, wherein $L\in\mathbb{N}_{\geq 1}$ (N is a natural number greater than or equal to 1). Given an input sequence x 805, the function $f(\ )$ is applied to the input sequence x to determine the model e 827 associated with the model that is desired to be used to process this input. Different from other embodiments, the models are clearly seperated and have no interaction, i.e., each model (expert) operates completely independently from one another. In one embodiment, given K models and an input sequence $x_l$, the function $f$ produces a single integer $f(xl)\in\{0, \ldots, k-1\}$ (hard select) that is the model e to be used for inference on this input data sequence $x_l$. The single value (hard select) 827 is generated to select a model for execution at a single tier 806. As an example: a system 800 consists of multiple models for language translation from multiple input languages (e.g., De, Fr, It, Sp) to a single output language (En). In this case, there would be 4 different models, each implementing the mapping (input language->En). The function $f(\ )$ could be a neural network that infers the input language and selects the according model.

Referring back to FIG. 11, in an embodiment, given input sequence $x=[x_1, x_2, \ldots, x_L]$, applying the function $f(\ )$ produces a single value (hard select) 825 for selecting a single expert/tier. In an embodiment, arbitrary processing block 810 produces a sequence of indices $[f(x1), f(x2), \ldots, f(xL)]$ and corresponding gating values 839 $[g_{f(x1)}(h1), g_{f(x2)}(h2), \ldots, g_{f(xL)}(hL)]=[\{1\}, \{1\}, \ldots, \{1\}]$, i.e., all produced gating values are equal to 1. Here, $x\in\mathbb{R}^d$, and $f(x)\in\mathbb{N}_{\geq 0}$.

The generated expert index 825 is determined based on the input $x_l$ for all tiles. That is, in an embodiment, the same arbitrary processing block 810 determines the virtual tile, i.e., expert indices for all physical tiles (tile T, tile T+1, etc.) and a data flow 830 of expert indices is communicated from arbitrary processing block 805 to the tier activation circuitry 815 at the current tile and/or other tiles, e.g., tile T+1. In an alternative implementation, the input sequence x can be provided to all tiles 802 simultaneously and each tile can determine its own active tier. As further shown in FIG. 11, in an example, received expert index 825 based on the input $x_l$ is used to activate an expert model at a tier, e.g., tier 806A that processes the data and any activations and generates further intermediate output activations 841. Further shown in FIG. 12 is the corresponding generated gating value (=1) 839 generated by expert selection function logic at the arbitrary processing block 810 for application to the output activations 841 after they are analog-to-digitally converted. This result is accumulated at gating circuitry 820 that scales, accumulates, and stores this model layer output.

Figure 13A:
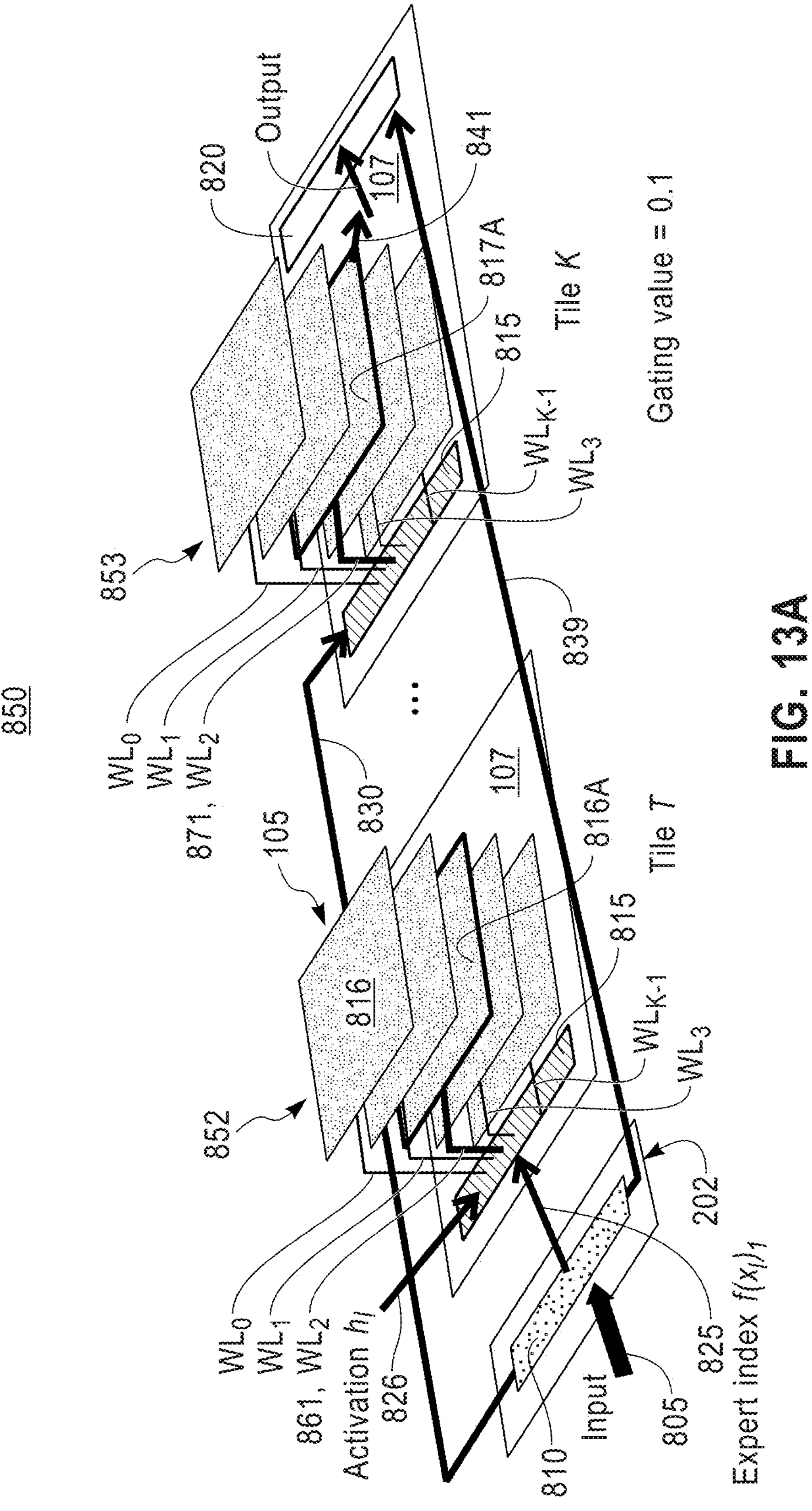
FIGS. 13A and 13B depict a further embodiment of a 3D CiM accelerator system configured for selecting multiple experts (models) that reside on different tiers of a 3D multi-model CiM system.
Figure 13B:
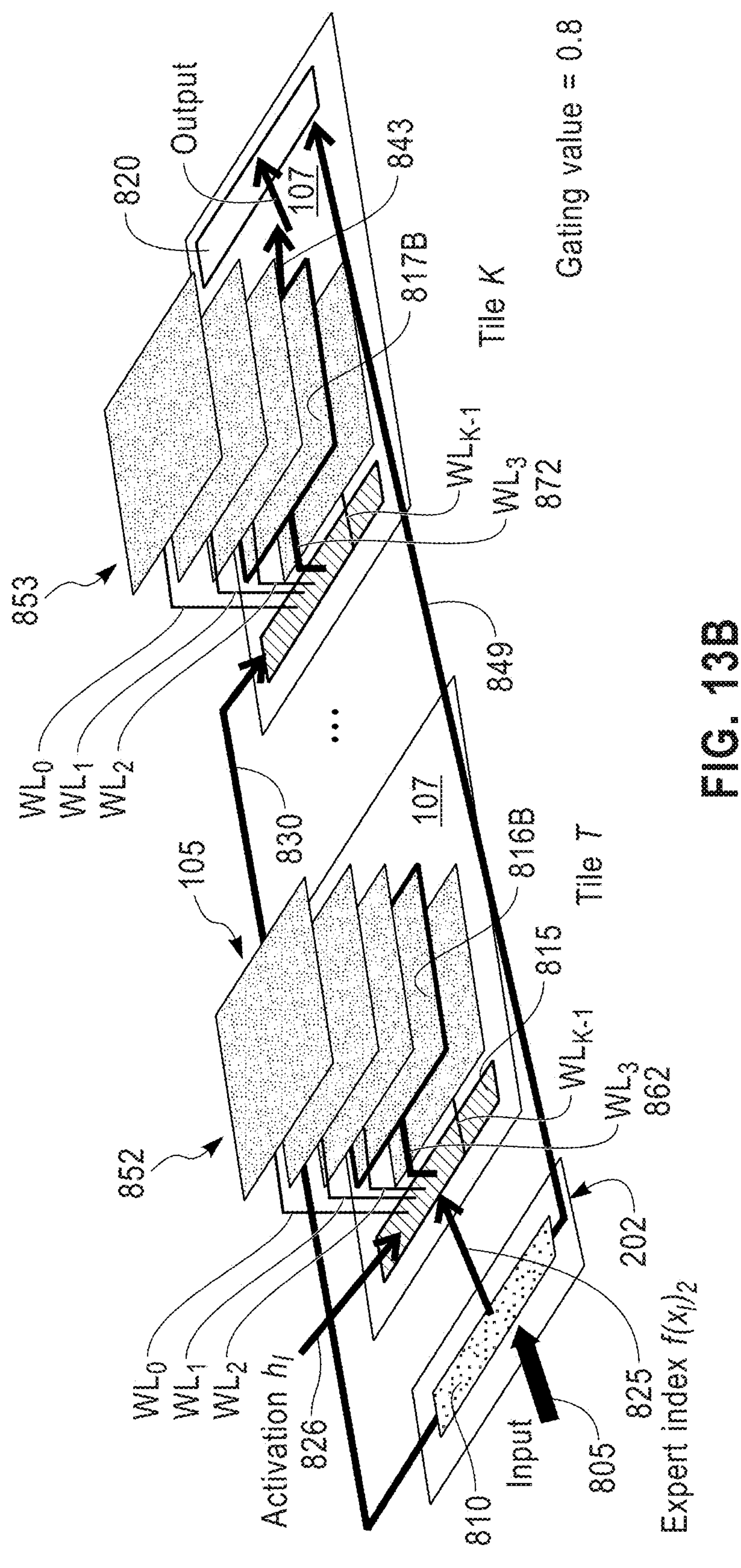

FIGS. 13A and 13B depict a further embodiment of a 3D CiM accelerator system 850 configured for selecting multiple experts (models) that reside on different tiers of a 3D multi-model CiM system. In this activation-based MoE embodiment, the activations received from the previous layer, is used/processed to determine which experts/tiers of tile 702 will be active. In this embodiment, the expert indices are calculated dynamically/on-the-fly. Here, the method can pick a model according to the user input and activate the layers in each tile corresponding to the particular model.

With reference to FIG. 13A, in a further embodiment, a 3D CiM accelerator system 850 implements multiple different models (experts) and is configured for selecting multiple expert(s) of the multi-model system. In this input-based multi-model system, given the input sequence $[x_1, x_2, \ldots, x_L]$, where $L\in\mathbb{N}_{\geq 1}$, the expert selection function $f$ is applied to determine the model indeces (soft select) that are desired to be used to process this input. The models are clearly separated and have no interaction. Given K models corresponding to multiple tiles 852 and an input sequence, the function $f$ produces a list of indeces that are the models to be used for inference. The function $f$ can select all models K as well. The gating is only applied at the final output of the inferences. This embodiment can be used for cases involving neural network ensembles.

As shown in FIG. 13A, an arbitrary processing block 810 is shown receiving input sequence $x_l$ 805 which block is an arbitrary implementation of expert selection or hash function $f(x_l)$. The block 810 receives input data sequence $x_l$ as input and outputs respective sequence of expert indices $f(x_l)$ 825 where l=1, 2, . . . , L. The block can perform this either in analog or in digital domain. The arbitrary processing block 810 can be a part of the same tile 852 or can physically reside in another part of the accelerator system 850. Tier activation circuitry 815 at tile T 852 associated with a neural network layer sequentially receives outputs $f(x_l)$ and activations $h_l$ 826 received from a prior layer processing to generate corresponding tier activation wordline signals. For example, at tile 852, in response to a first generated expert indice, e.g., $f(x_l)_1$, tier activation circuit 815 generates a first wordline signal, e.g., wordline 861 (e.g., $WL_2$), to activate a first tier associated with a first model, e.g., tier 816A shown in FIG. 13A for processing/generating further output activations $h_l$. Further, via data flow 830, model selection outputs $f(x_l)_1$ from arbitrary processing block are simultaneously communicated to the tier activation circuit 815 of other tiles, e.g., a further tile K 853, to activate the same wordline and select another first model, e.g., model run at a tier 817A at tile 853 to process input data sequence $x_l$. Multiple models at different tiles can be selected for running this input data. Further shown in FIG. 13A is the corresponding generated gating value 839 generated by expert selection function logic in response to the first input $x_1$ of the input sequence received at the arbitrary processing block 810 for application to the output activations 841 after they are analog-to-digitally converted at the further tile 853. This result is propagated to and accumulated at gating circuitry 820 at the last tile K 853 that scales and accumulates the model layer outputs from all tiles. In the embodiment depicted in FIGS. 13A, 13B, the generated output activations that are scaled and accumulated at gating circuitry 820 are transmitted to a next tier at tile 852 to be activated based on the next expert index, i.e., $f(x_2)$, generated in response to the second input $x_2$ of the input sequence received at the arbitrary processing block 810. That is, in this embodiment, received expert indices 825 based on a current input sequence $x_l$ is used to sequentially activate the expert models at one or more tiers to process the current input data in addition to a set of generated activations received from a memory storing the output (not shown) activations result of the immediately prior iteration processing of the sequence $h_l$ 826. The processing at the tier generates further intermediate output activations 841 to be scaled, accumulated, and stored for use in a next iteration of the input sequence.

Thus, in a next processing sequence of sequentially activating the expert models at one or more tiers as shown in FIG. 13B, in response to a next (e.g., second) of the generated expert indices, i.e., $f(x_l)_2$, tier activation circuit 815 generates a next wordline signal, e.g., wordline 862 (e.g., $WL_3$), to activate a further tier associated with a second model, e.g., tier 816B shown in FIG. 13B for processing the input data. Further, via data flow 830, expert model selection outputs $f(x_l)_2$ are simultaneously communicated from arbitrary processing block to the tier activation circuit 815 of further tiles, e.g., tile K 853, to activate the same wordline and select another second model, e.g., model run at a tier 817B at tile 853 to process input data sequence $x_l$. Further shown in FIG. 13B is the corresponding generated gating value 849 generated by expert selection function logic in response to the second input $x_2$ of the input sequence received at the arbitrary processing block 810 for application to the output activations 843 after they are analog-to-digitally converted. This result is propagated to and accumulated at gating circuitry 820 that scales, accumulates and stores this model layer output.

In this further embodiment, processes depicted in FIGS. 13A, 13B, are iterative, i.e., and are repeated for as many models/tiers as required by the input sequence $x_l$ and the expert selection function logic applied at arbitrary processing block 810. At each iteration, the generated output activations that are scaled and accumulated at gating circuitry 820 are transmitted to a next tier at a tile 852 or another tile 853, the next tier being activated based on the next expert index of the output sequence of indices, i.e., $f(x_l)$, generated in response to the input $x_l$ of the input sequence received at the arbitrary processing block 810. Further, in this embodiment, the gating values are determined in the expert selection function logic. A non-limiting example of a gating function is:

softmax(input*fixed_weight_matrix)

where the fixed_weight_matrix represents the matrix that was learned in a different process.

In this further embodiment depicted by iterative processes shown in FIGS. 13A, 13B, for each input x, the expert selection logic function $f(x)$ produces a list of values (soft select) to select multiple experts/tiers. As an illustrative, non-limiting example, expert selection logic function $f(x)$ generates an example output as follows:

$f(x)=[\{2,3\}]$ with gating function outputting: $g_{\{2,3\}}(h)=[\{0.1, 0.8\}]$ indicating that for processing the activations h, two experts 2 and 3 are selected with respective weighting coefficients=0.1 for the output of expert 2 (processing shown in FIG. 13A) and weighting coefficient=0.8 for the output of expert 3 (processing shown in FIG. 13B).

Figure 14:
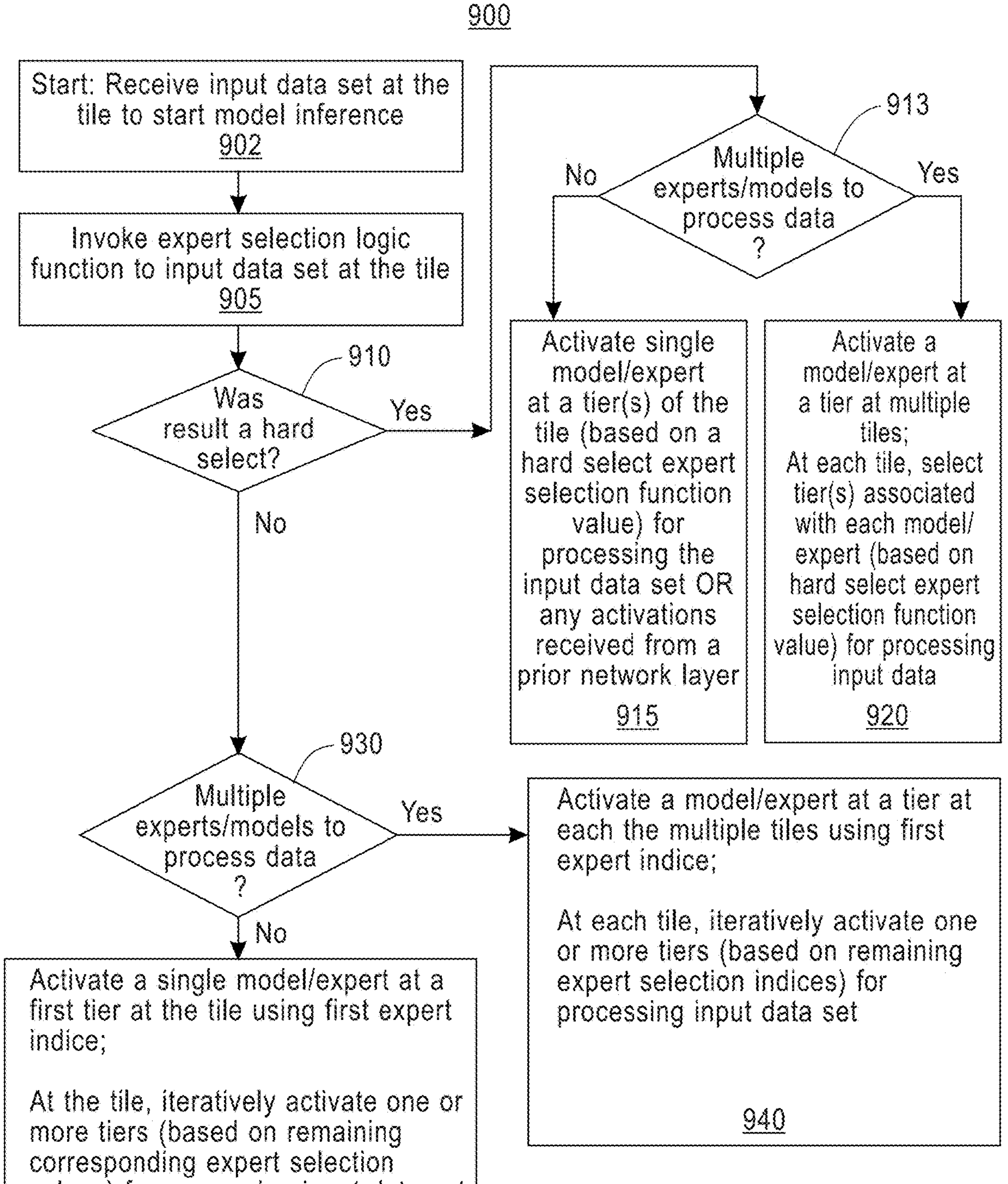
FIG. 14 depicts a method implemented at an arbitrary processing block at or associated with a virtual tile of the 3D CiM MoE accelerator system of the various embodiments.

FIG. 14 depicts a method 900 implemented at an arbitrary processing block at or associated with a tile of the 3D CiM MoE accelerator system. Such method can be implemented by control processing implementing expert selection function logic at the tile or by control processing implementing expert selection function logic at an arbitrary processing block, e.g., in embodiments depicted in FIGS. 4, 8A, 8B, FIG. 11, etc. Method 900 begins with the receiving at expert selection function logic at an arbitrary processing block or at a tile of an input data set to begin, at 902, the MoE model inference. The input data set can include input data and/or intermediate activations generated by a prior processing iteration at a same or different tile. As shown at method 905, the system invokes expert selection logic function (e.g., a hash function) to apply the hash function to the input data set at the tile. At 910, a determination is made as to whether the expert selection logic function results in generation of a hard select value (e.g., a single expert selection index value). If a single hard select value results from expert selection logic function, then the process proceeds to 913 where a further determination is made as to whether multiple experts/models are to be invoked to process input data. At 913, if the system determines that only a single expert/model is to be invoked to process input data, then the process proceeds to 915 to activate a single model/expert at a single tier of the tile (based on the hard select expert selection function value) for processing input data set. Otherwise, at 913, if it is determined that multiple experts/models are to be invoked to process input data, then the process proceeds to 920, FIG. 14, where the system activates a model/expert at a tier at multiple tiles. The logic employed at the arbitrary processing block or expert selection function logic block receiving the input data set can determine the other of the multiple physical tiles of the virtual tile to process the same input data set. Alternatively, the expert selection function result can be transmitted for receipt at all or a subset of tiles in the system and each tile will independently process the hard select value to determine whether a corresponding expert/tier at the respective tile is to be activated. At each of the determined multiple tiles, a tier associated with each model/expert will be selected (based on hard select expert selection function value) to also process the received input data.

Referring back to 910, FIG. 14, if is determined the applied expert selection logic function results in generation of a soft select values (e.g., more than a single expert selection index value), the process proceeds to 930 where a further determination is made as to whether multiple experts/models are to be invoked to process the received input data. At 930, if the system determines that only a single expert/model is to be invoked to process input data at a single tile, then the process proceeds to 935 to activate a single model/expert at a first tier of the tile (based on the first soft selected expert index value result) for processing the input data set and any activations/outputs scaled and received from the previous network layer. Then, at the tile, the system iteratively activates one or more next tiers (based on remaining corresponding soft selected expert index values) for processing input data set.

Otherwise, at 930, if it is determined that multiple experts/models are to be invoked to process input data, then the process proceeds to 940, FIG. 14, where the system activates a model/expert at each of multiple physical tiles of a virtual tile. The logic employed at the arbitrary processing block or expert selection function logic block receiving the input data set can determine which of the other multiple physical tiles to process the same input data set. Alternatively, the expert selection function result can be transmitted for receipt at all or a subset of tiles in the system and each respective tile will independently process the respective soft select expert selection index values to activate the corresponding expert(s)/tier(s) at the respective tile. At each of the determined multiple physical tiles, the system will iteratively activate one or more tiers (based on remaining corresponding soft select expert index values) to also process the received input data set and any activations/outputs scaled and received from the previous neural network model layer.

Figure 15:
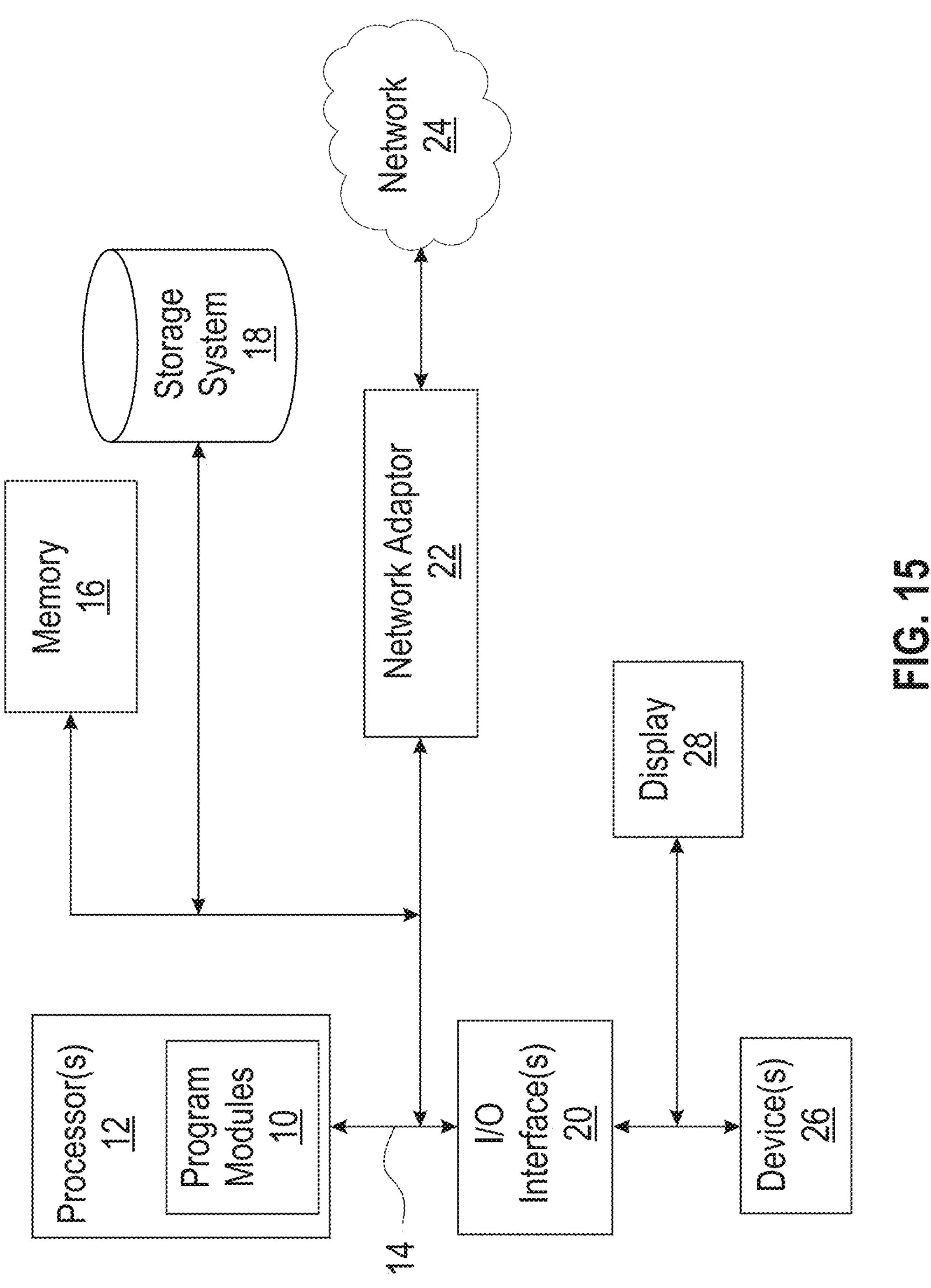
FIG. 15 illustrates an example computing system for controlling the dynamic MoE switching in the various embodiments of a 3D CiM accelerator system.

FIG. 15 illustrates an example computing system in accordance with the present invention that may provide the control unit function-based activation of memory tiers depicted in the methods described in FIG. 14 for controlling the dynamic MoE switching in a 3D CiM accelerator system. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in the figures may include, but are not limited to, integrated circuits, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules 10 may include routines, programs, objects, components, logic, data structures, and so on that perform particular tasks and/or implement particular input data and/or data types in accordance with the methods described herein with respect to FIG. 14.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20. Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. Although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A compute-in-memory (C-i-M) system comprising:

a 3D memory system including multiple tiers of compute-in-memory devices, each tier comprising a memory system implementing an expert of a mixture of experts (MoE) neural network model, an expert mapped to multiple neural network model layers, the neural network model layers mapped to one or more of said multiple tiers of C-i-M devices;

a control processor configured to:

receive, at a current neural network model layer, an input data sequence;

implement a logic circuit for applying a function to said received input data sequence and responsively generate an output expert selection value to select an expert of said MoE neural network model;

determine one or more tiers of C-i-M devices based on said output expert selection value; and dynamically activate said one or more tiers of C-i-M devices associated with neural network model layers mapped to the selected expert; and the control processor configuring a computing path at the selected one or more of said multiple tiers implementing the expert, said computing path for processing said input data sequence at a first layer of said network model layers mapped to the selected expert and generating an output activation for use at further neural network model layers.

2. The C-i-M system as claimed in claim 1, wherein said received input data sequence comprises one of: model input data for inference processing by the selected expert at the mapped neural network model layers or input data based on outputs of a prior neural network model layer.

3. The C-i-M system as claimed in claim 2, wherein the activated tier is associated with a current layer of said MoE neural network model, wherein said received input data sequence comprises: hidden layer activation values generated as a result of processing at the prior neural network model layer.

4. The C-i-M system as claimed in claim 3, wherein the selected expert at the mapped neural network model layers generates hidden layer activation values for propagation to one or more next neural network model layers at a different tier of compute-in-memory devices implementing the same selected expert.

5. The C-i-M system as claimed in claim 1, wherein one or more selected experts at the mapped neural network model layers process the same received input data sequence, each one or more selected experts generating one of: a model output or hidden layer activation values responsive to the processing of the received input data sequence, the generated hidden layer activation values for propagation to a different tier of compute-in-memory devices, or for propagation to one or more next neural network model layers not implementing an expert.

6. The C-i-M system as claimed in claim 4, further comprising:

gating circuitry for scaling and accumulating said generated hidden layer activation values implementing the inference processing by the selected expert at one or more of said multiple tiers of C-i-M devices implementing the selected expert; said gating circuitry further propagating said accumulated hidden layer activation values to a next network model layer.

7. The C-i-M system as claimed in claim 4, further comprising:

a pulse signal generator for generating a pulse signal having a characteristic associated with a value of a received input data of said input data sequence, said control processor implementing said pulse signal when performing a matrix-vector multiplication operation at the selected tier of compute-in-memory devices implementing the selected expert.

8. The C-i-M system as claimed in claim 4, wherein each said tier of compute-in-memory devices comprises a non-volatile memory system configured as a cross-bar array of memory storage cells implemented for matrix-vector multiplication operations for the inference processing by the selected expert of said MoE neural network model.

9. A compute-in-memory (C-i-M) system comprising:

multiple processing tiles, each processing tile comprising multiple tiers of C-i-M devices, each tier comprising a cross-bar array of memory cells forming a 3D memory system, one or more tiers of said multiple tiers implementing an expert of a mixture of experts (MoE) neural network model configured to receive input data for inference processing, an expert mapped to multiple neural network model layers, the neural network model layers mapped to one or more of said multiple tiers of C-i-M devices at the one or more processing tiles;

a control processor configured to:

receive, at a current neural network model layer, an input data sequence;

implement a logic circuit for applying a function to said received input data sequence and responsively generate an output expert selection value to select an expert of said MoE model;

determine one or more tiers of C-i-M devices based on said output expert selection value; and dynamically activate said one or more tiers of C-i-M devices associated with neural network model layers mapped to the selected expert; and configure a computing path at the selected one or more of said multiple tiers implementing the expert, said computing path for processing said received input data sequence at a first layer of said network model layers mapped to the selected expert and generating an output activation for use at further neural network model layers.

10. The C-i-M system as claimed in claim 9, wherein received input data sequence comprises one of: model input data for inference processing by the selected expert at the mapped neural network model layers or input data based on outputs of a prior neural network model layer.

11. The C-i-M system as claimed in claim 10, wherein the activated tier is associated with a current layer of said MoE neural network model, said received input data sequence comprising: hidden layer activation values generated as an output result of processing at a tier of compute-in-memory devices at a prior MoE neural network model layer.

12. The C-i-M system as claimed in claim 11, further comprising at a processing tile:

gating circuitry for scaling and accumulating said generated hidden layer activation values implementing the inference processing results by the selected expert at one or more of said multiple tiers of C-i-M devices implementing the selected expert, said gating circuitry further propagating accumulated activation result values to one or more of: a different layer of the same model at a same tier or at a different tier at one of: a same processing tile or different processing tile.

13. A method for operating a compute-in-memory (C-i_M) system comprising:

receiving, at a current neural network model layer of a mixture of experts (MoE) neural network model, an input data sequence;

configuring, by a control processor, one or more processing tiles based on the received input data sequence, each processing tile comprising multiple tiers of C-i-M devices forming a 3D memory system, one or more tiers of said multiple tiers implementing an expert of the MoE a neural network model, the expert mapped to multiple neural network model layers, the neural network model layers mapped to one or more of said multiple tiers of C-i-M devices at the one or more processing tiles;

implementing, at the one or more processing tiles, a logic circuit for applying a function to said received input data sequence and responsively generating an output expert selection value to select an expert of said MoE model;

determining, at the one or more processing tiles, one or more tiers of C-i-M devices based on said output expert selection value; and dynamically activating, at the one or more processing tiles, said one or more tiers of C-i-M devices associated with neural network model layers mapped to the selected expert; and configuring, using the control processor, a computing path at one or more selected tiers of said multiple tiers implementing the expert, said computing path for processing said input data sequence at a first layer of said MoE network model layers mapped to the selected expert and generating one or more output activations for use at further neural network model layers.

14. The method as claimed in claim 13, wherein said received input data sequence comprises one of: model input data for inference processing by the selected expert at the mapped neural network model layers or input data based on outputs of a prior neural network model layer, said method further comprising:

at each one or more selected experts, generating one of: a model output or hidden layer activation values responsive to the processing of the received input data sequence; and propagating the generated hidden layer activation values to a different tier of compute-in-memory devices, to a different tile, or to a next neural network model layer not implementing an expert.

15. The method as claimed in claim 14, further comprising:

scaling and accumulating said generated hidden layer activation values responsive to the inference processing by the selected expert at one or more of said multiple tiers of C-i-M devices implementing the selected expert at one or more tiles; and propagating said accumulated hidden layer activation values to a same expert at a different tier of C-i-M devices at one of: a same processing tile or a different processing tile, or propagating said accumulated hidden layer activation values to a next layer of said MoE neural network model.

16. The method as claimed in claim 15, further comprising:

generating, at the logic circuit, a gating value responsive to said received input data sequence, said gating value used for scaling said output activation values prior to said propagating.

17. The method as claimed in claim 14, wherein the activated tier is implementing a current layer of said MoE neural network model, said received input data sequence comprises:

hidden layer activation values generated as a result of processing at and propagated from a prior neural network model layer.

* * * * *